United States Patent
Bastani et al.

(10) Patent No.: US 11,663,689 B2
(45) Date of Patent: May 30, 2023

(54) FOVEATED RENDERING USING EYE MOTION

(71) Applicant: Meta Platforms Technologies, LLC, Menlo Park, CA (US)

(72) Inventors: Behnam Bastani, Palo Alto, CA (US); Tianxin Ning, Mountain View, CA (US); Haomiao Jiang, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/526,681

(22) Filed: Nov. 15, 2021

(65) Prior Publication Data
US 2022/0076373 A1 Mar. 10, 2022

Related U.S. Application Data

(63) Continuation of application No. 16/702,179, filed on Dec. 3, 2019, now Pat. No. 11,176,637.

(51) Int. Cl.
| | |
|---|---|
| *G06T 19/00* | (2011.01) |
| *G06T 3/00* | (2006.01) |
| *G06F 3/01* | (2006.01) |
| *G06T 1/60* | (2006.01) |
| *G06T 11/00* | (2006.01) |

(52) U.S. Cl.
CPC ............ *G06T 3/0012* (2013.01); *G06F 3/013* (2013.01); *G06T 1/60* (2013.01); *G06T 11/00* (2013.01); *G06T 19/006* (2013.01)

(58) Field of Classification Search
None
See application file for complete search history.

(56) References Cited

U.S. PATENT DOCUMENTS

| | | |
|---|---|---|
| 2016/0262613 A1 | 9/2016 | Klin et al. |
| 2017/0287446 A1 | 10/2017 | Young et al. |
| 2018/0113316 A1 | 4/2018 | Hua et al. |
| 2018/0137598 A1 | 5/2018 | Spitzer et al. |

(Continued)

FOREIGN PATENT DOCUMENTS

| | | |
|---|---|---|
| GB | 2567553 A | 4/2019 |
| WO | 2017031089 A1 | 2/2017 |

(Continued)

OTHER PUBLICATIONS

Patney A., et al., "Towards Foveated Rendering for Gaze-Tracked Virtual Reality," Association for Computing Machinery Transactions on Graphics, Nov. 2016, vol. 35 (6), Article 179, 12 pages.

(Continued)

*Primary Examiner* — Nicholas R Wilson
(74) *Attorney, Agent, or Firm* — Foley & Lardner LLP

(57) ABSTRACT

A method for providing imagery to a user on a display includes receiving eye tracking data. The method also includes determining a current gaze location and a relative distance between the current gaze location and an edge of the display using the eye tracking data. The method also includes defining a first tile centered at the current gaze location and multiple tiles that surround the first tile using the current gaze location and the relative distance between the current gaze location and the edge of the display. The method includes providing a foveated rendered image using the first tile and the multiple tiles.

20 Claims, 6 Drawing Sheets

(56) References Cited

U.S. PATENT DOCUMENTS

| | | | |
|---|---|---|---|
| 2018/0164592 A1 | 6/2018 | Lopes et al. |
| 2018/0224935 A1 | 8/2018 | Thunstrom |
| 2018/0308455 A1 | 10/2018 | Hicks et al. |
| 2019/0025589 A1 | 1/2019 | Haddick |
| 2019/0094958 A1 | 3/2019 | Williams et al. |
| 2019/0347763 A1 | 11/2019 | Goel et al. |

FOREIGN PATENT DOCUMENTS

| | | |
|---|---|---|
| WO | 2019026765 A1 | 2/2019 |
| WO | 2019067157 A1 | 4/2019 |
| WO | 2019092399 A1 | 5/2019 |

OTHER PUBLICATIONS

International Search Report and Written Opinion for International Application No. PCT/US2020/037072, dated Sep. 9, 2020, 10 Pages.

Notice of Allowance dated Jan. 4, 2021 for U.S. Appl. No. 16/818,750, dated Mar. 13, 2020, 33 Pages.

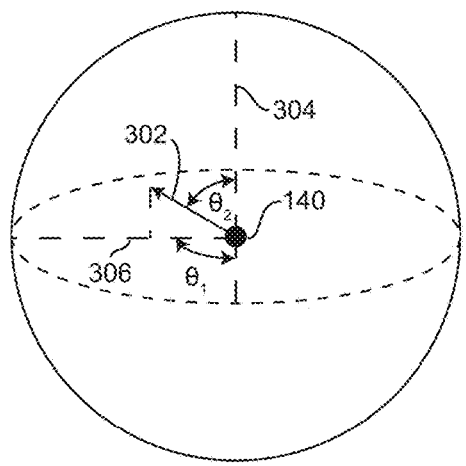
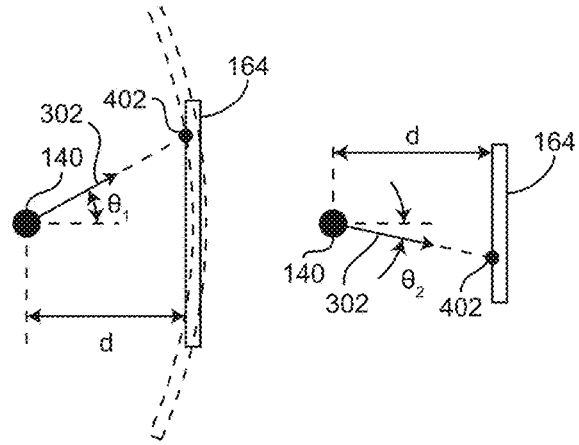
FIG. 3　　　FIG. 4　　　FIG. 5
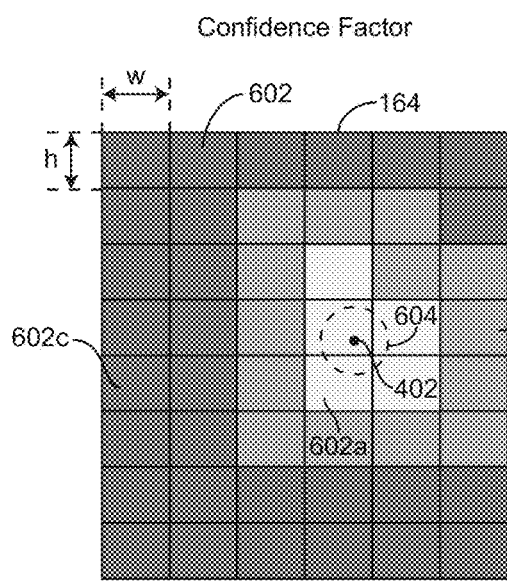
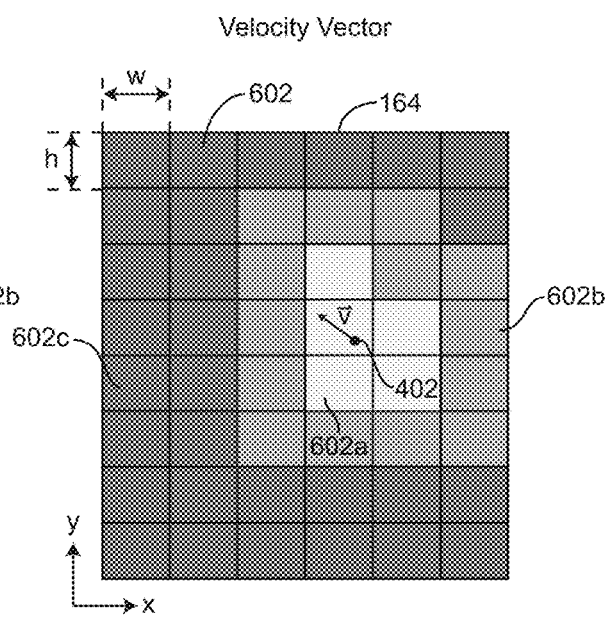
FIG. 6　　　FIG. 7

FOVEATED RENDERING USING EYE MOTION

CROSS-REFERENCE TO RELATED PATENT APPLICATION

This application is a continuation of U.S. application Ser. No. 16/702,179, filed Dec. 3, 2019, now U.S. Pat. No. 11,176,637, granted Nov. 16, 2021, the entire disclosure of which is incorporated by reference herein.

FIELD OF THE DISCLOSURE

The present disclosure relates generally to display systems. More particularly, the present disclosure relates to systems and methods for using eye tracking with foveated rendering.

BACKGROUND

The present disclosure relates generally to augmented reality (AR) and/or virtual reality (VR) systems. AR and VR systems can be used to present various images, including two-dimensional (2D) and three-dimensional (3D) images, to a user. For example, AR or VR headsets can be used to present images to the user in a manner that is overlaid on a view of a real world environment or that simulates a virtual environment. To render convincing, life-like AR/VR images, the AR/VR systems can use eye tracking to track the user's eye and accordingly present images.

SUMMARY

One implementation of the present disclosure relates to a method for providing imagery to a user on a display. The method includes receiving eye tracking data, according to some embodiments. In some embodiments, the method includes determining a gaze location on the display and at least one of a confidence factor of the gaze location, or a speed of the change of the gaze location using the eye tracking data. In some embodiments, the method includes establishing multiple tiles using the gaze location and at least one of the confidence factor or the speed of the change of the gaze location. In some embodiments, the method includes providing a foveated rendered image using the multiple tiles.

Another implementation of the present disclosure relates to a head mounted display. The head mounted display may include a combiner, an imaging device, and processing circuitry. The combiner is configured to provide foveated imagery to a user, according to some embodiments. The imaging device is configured to obtain eye tracking data, according to some embodiments. The processing circuitry is configured to receive the eye tracking data from the imaging device, according to some embodiments. In some embodiments, the processing circuitry is configured to determine a gaze location and at least one of a confidence factor of the gaze location or a time rate of change of the gaze location using the eye tracking data. In some embodiments, the processing circuitry is configured to define or adjust a radius or falloff (e.g., a fall-off parameter) of a fovea region defined by multiple tiles using the gaze location and at least one of the confidence factor or the time rate of change of the gaze location. In some embodiments, the processing circuitry is configured to provide a foveated rendered image to the user using the multiple tiles and the combiner.

Another implementation of the present disclosure relates to a display system for providing foveated imagery to a user. In some embodiments, the display system includes a combiner, and imaging device, and processing circuitry. In some embodiments, the combiner is configured to provide imagery to the user. In some embodiments, the imaging device is configured to obtain eye tracking data. In some embodiments, the processing circuitry is configured to receive the eye tracking data from the imaging device. In some embodiments, the processing circuitry is configured to determine a gaze location, a confidence factor of the gaze location, and a speed of the change of the gaze location. In some embodiments, the processing circuitry is configured to define a first tile and multiple tiles that surround the first tile using at least one of the gaze location, the confidence factor of the gaze location, or the speed of the change of the gaze location. In some embodiments, the processing circuitry is configured to provide foveated imagery to the user using the first tile and the plurality of tiles.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 3 is a spherical coordinate system showing a gaze vector of a user's eye, according to some embodiments.

FIG. 4 is a top view of the gaze vector of FIG. 3 directed towards a display screen, according to some embodiments.

FIG. 5 is a side view of the gaze vector of FIG. 3 directed towards a display screen, according to some embodiments.

FIG. 6 is a tiled display buffer of a display screen with foveated rendering showing a visualization of a confidence factor of a gaze location, according to some embodiments.

FIG. 7 is the tiled display buffer of the display screen of FIG. 6 showing a velocity vector of the gaze location, according to some embodiments.

DETAILED DESCRIPTION

Overview

Figure 1:
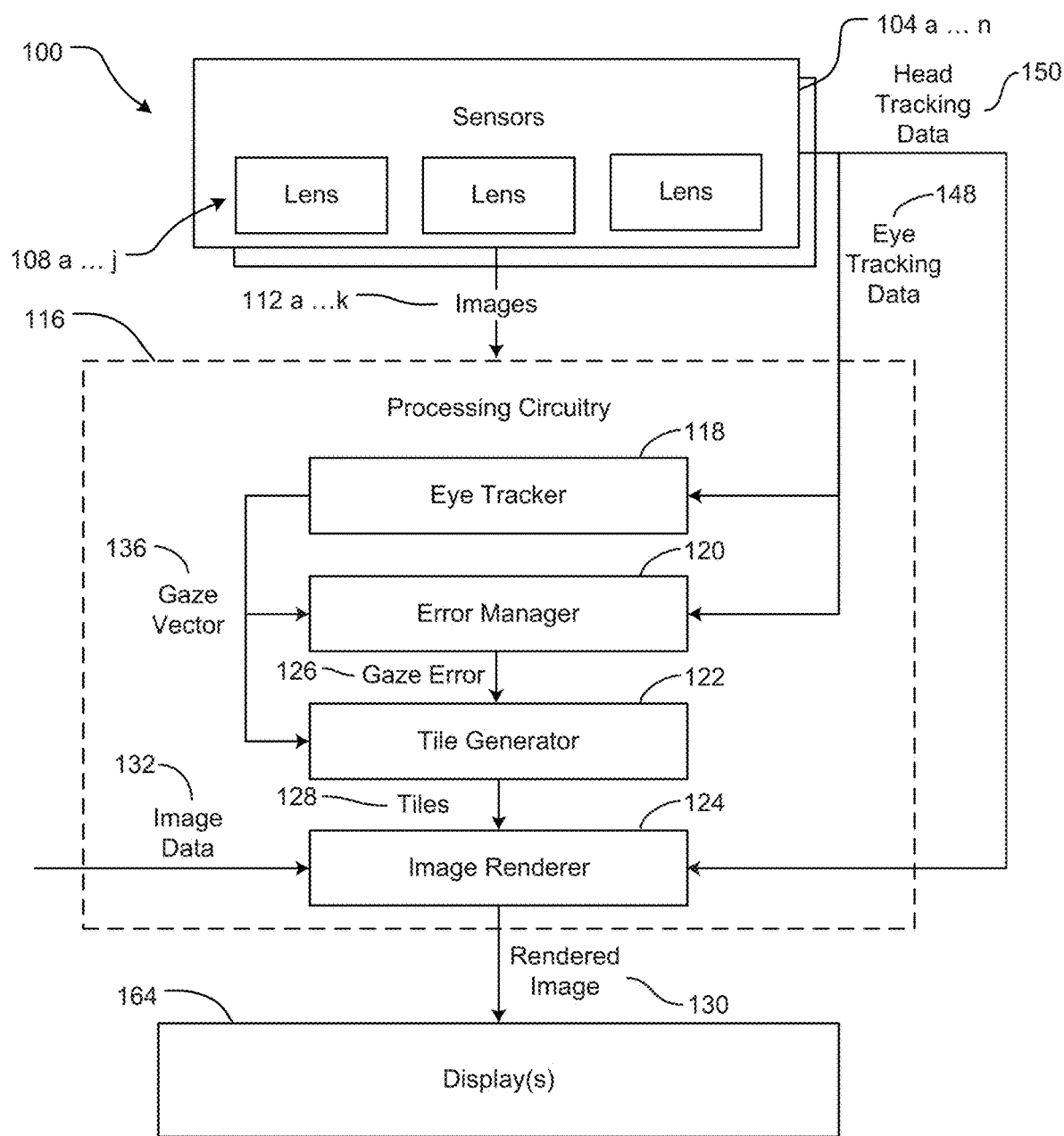
FIG. 1 is a block diagram of a display system, according to some embodiments.

Referring generally to the FIGURES, systems and methods for providing foveated images to a user are shown, according to some embodiments. Tiles are used to display the foveated images, according to some embodiments. In some embodiments, tiles are used to define, construct, generate, etc., a display buffer, a display image, a render buffer, etc., of a display. A user's eye is tracked to determine gaze direction and/or focal point, according to some embodiments. The gaze direction and/or focal point is used to determine a gaze location on a display, according to some embodiments. The gaze location can be a gaze location (X, Y) on a two dimensional display or a gaze location (X, Y, Z) on a three dimensional display. In some embodiments, a confidence factor associated with the gaze direction and/or the gaze location on the display is also determined.

Various eye tracking sensors, devices, hardware, software, etc., are used to track the user's eye and to determine the gaze location on the display, according to some embodiments. A tile is defined that is centered at the gaze location on the display buffer of the display, and additional tiles are also defined to fill out remaining area of the display buffer, according to some embodiments. The tile that is centered at the gaze location on the display buffer of the display is updated in real-time to track the user's gaze direction as it changes, according to some embodiments. In some embodiments, the tile that is centered at the gaze location is for imagery at a high image quality, and tiles that are adjacent or near or otherwise on the display buffer of the display are for imagery at a same or lower quality.

The use of the tile centered at the gaze location and the additional tiles facilitates a foveated display buffer or a foveated display image, according to some embodiments. In some embodiments, imagery of the tile centered at the gaze location and the additional tiles are rasterized to achieve a foveated display buffer of the imagery. In some embodiments, sizes and/or shapes of the various tiles are adjusted in real-time to account for error associated with the gaze direction of the user's eye. The system can rasterize image data for tiles with lower resolution, lower detail, or lower image quality and upscale (e.g., using nearest neighbor) the rasterized imagery to provide a smooth transition between tiles, according to some embodiments. In some embodiments, tiles that are further away from the gaze location are associated with lower image quality. Advantageously, the systems and methods described herein facilitate reduced power consumption of processing circuitry, but still provide detailed imagery within the fovea region, according to some embodiments.

In some embodiments, a velocity or a rate of change of the gaze location is also determined. The velocity or rate of change of the gaze location can include a magnitude and direction or may be determined in terms of horizontal and vertical velocity components. In some embodiments, a relative distance between the gaze location and one or more edges of the display are determined. The relative distance may indicate how close the gaze location is to the edges of the display.

A fovea region can be defined on the display having a radius. The fovea region may be circular or elliptical and can be approximated with square or rectangular tiles. In some embodiments, the fovea region is centered at the gaze location. In some embodiments, the radius or diameter of the fovea region is determined using at least one of the relative distance between the gaze location and one or more of the edges or boundaries of the display, the rate of change (e.g., the velocity) of the gaze location, or the confidence factor. The fovea region may also have a fall-off parameter that indicates a rate of decay or a rate of change of image quality (e.g., resolution, render quality, etc.) across different sets of the tiles with respect to increased distance from the center of the fovea region or with respect to increased distance from the gaze location. In some embodiments, the fall-off parameter is selected or adjusted using at least one of the relative distance between the gaze location and one or more of the edges or boundaries of the display, the rate of change (e.g., the velocity) of the gaze location, or the confidence factor. In some embodiments, a size of one or more of the tiles is also determined, defined, adjusted, etc., using at least one of the relative distance between the gaze location and one or more of the edges or boundaries of the display, the rate of change (e.g., the velocity) of the gaze location, or the confidence factor.

Virtual Reality or Augmented Reality System

Referring now to FIG. 1, a system 100 (e.g., a display system, a head mounted display system, a wearable display system, etc.) can include a plurality of sensors 104a . . . n, processing circuitry 116, and one or more displays 164. System 100 can be implemented using HMD system 200 described in greater detail below with reference to FIG. 2. System 100 can be implemented using the computing environment described with reference to FIG. 4. System 100 can incorporate features of and be used to implement features of virtual reality (VR) systems. At least some of processing circuitry 116 can be implemented using a graphics processing unit (GPU). The functions of processing circuitry 116 can be executed in a distributed manner using a plurality of processing units.

Processing circuitry 116 may include one or more circuits, processors, and/or hardware components. Processing circuitry 116 may implement any logic, functions or instructions to perform any of the operations described herein. Processing circuitry 116 can include any type and form of executable instructions executable by any of the circuits, processors or hardware components. The executable instructions may be of any type including applications, programs, services, tasks, scripts, libraries processes and/or firmware. Any of eye tracker 118, error manager 120, tile generator 122, an image renderer 124 may be any combination or arrangement of circuitry and executable instructions to perform their respective functions and operations. At least some portions of processing circuitry 116 can be used to implement image processing executed by sensors 104.

Sensors 104a . . . n can be image capture devices or cameras, including video cameras. Sensors 104a . . . n may be cameras that generate images of relatively low quality (e.g., relatively low sharpness, resolution, or dynamic range), which can help reduce the size, weight, and power requirements of system 100. For example, sensors 104a . . . n can generate images having resolutions on the order of hundreds of pixels by hundreds of pixels. At the same time, the processes executed by system 100 as described herein can be used to generate display images for presentation to a user that have desired quality characteristics, including depth characteristics.

Sensors 104a . . . n (generally referred herein as sensors 104) can include any type of one or more cameras. The cameras can be visible light cameras (e.g., color or black and white), infrared cameras, or combinations thereof. Sensors 104a . . . n can each include one or more lenses 108 a . . . j generally referred herein as lens 108). In some embodiments, sensor 104 can include a camera for each lens 108. In some embodiments, sensor 104 include a single camera with multiple lenses 108 a . . . j. In some embodiments, sensor 104 can include multiple cameras, each with multiple lenses 108. The one or more cameras of sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing calibration techniques described herein.

The one or more cameras of sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

System 100 can include a first sensor (e.g., image capture device) 104a that includes a first lens 108a, first sensor 104a arranged to capture a first image 112a of a first view, and a second sensor 104b that includes a second lens 108b, second sensor 104b arranged to capture a second image 112b of a second view. The first view and the second view may correspond to different perspectives, enabling depth information to be extracted from first image 112a and second image 112b. For example, the first view may correspond to a left eye view, and the second view may correspond to a right eye view. System 100 can include a third sensor 104c that includes a third lens 108c, third sensor 104c arranged to capture a third image 112c of a third view. As described with reference to FIG. 2, the third view may correspond to a top view that is spaced from an axis between first lens 108a and second lens 108b, which can enable system 100 to more effectively handle depth information that may be difficult to address with first sensor 104a and second sensor 104b, such as edges (e.g., an edge of a table) that are substantially parallel to the axis between first lens 108a and second lens 108b.

Light of an image to be captured by sensors 104a . . . n can be received through the one or more lenses 108 a . . . j. Sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, sensors 104a . . . n can use the sensor circuitry to generate first image 112a corresponding to the first view and second image 112b corresponding to the second view. The one or more sensors 104a . . . n can provide images 112a . . . k to processing circuitry 116. The one or more sensors 104a . . . n can provide images 112a . . . k with a corresponding timestamp, which can facilitate synchronization of images 112a . . . k when image processing is executed on images 112a . . . k, such as to identify particular first and second images 112a, 112b representing first and second views and having the same timestamp that should be compared to one another to calculate gaze information.

Figure 2:
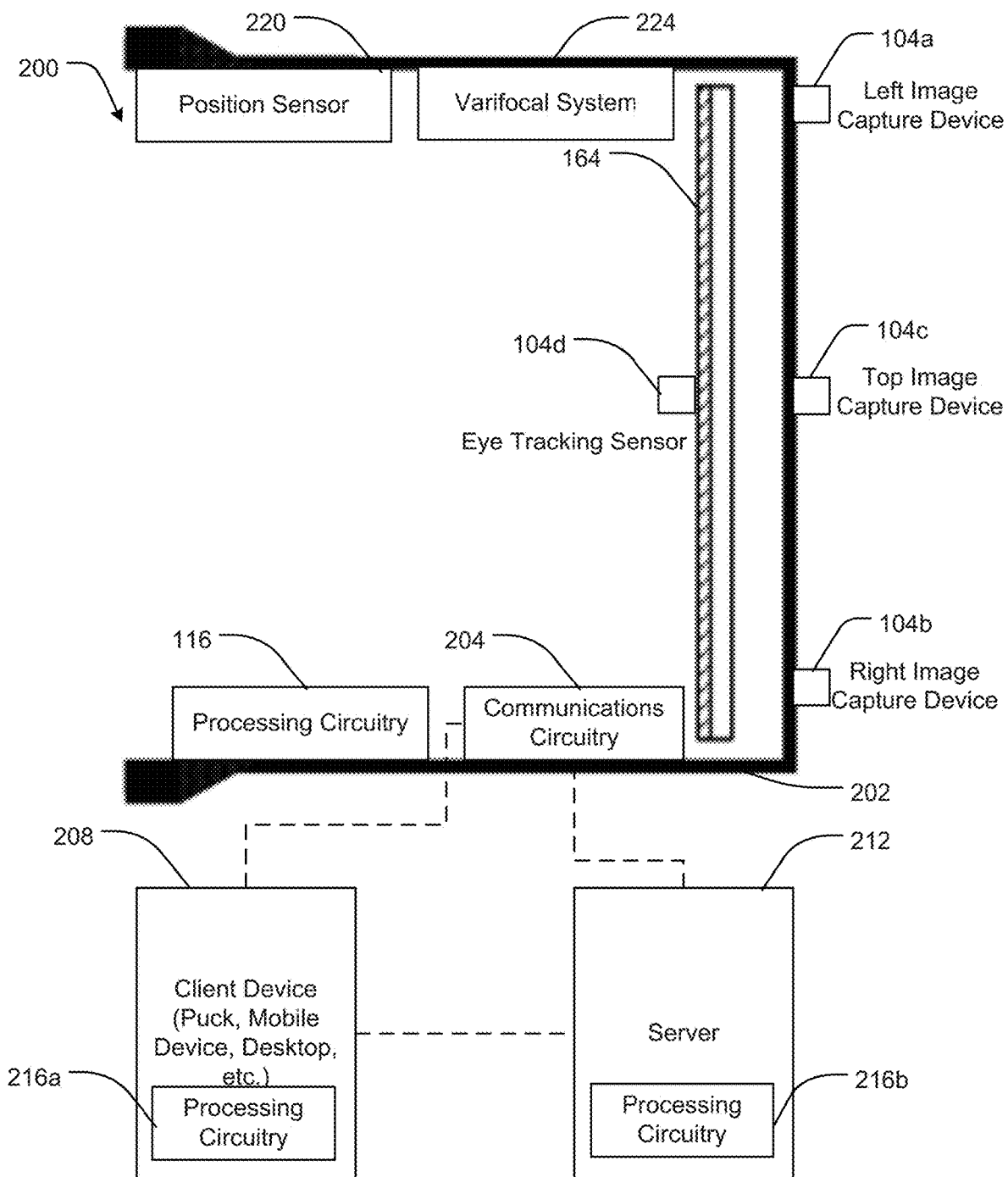
FIG. 2 is a schematic diagram of a head-mounted display (HMD) system, according to some embodiments.

Sensors 104 can include eye tracking sensors 104 or head tracking sensors 104 that can provide information such as positions, orientations, or gaze directions of the eyes or head of the user (e.g., wearer) of an HMD. In some embodiments, sensors 104 are inside out tracking cameras configured to provide images for head tracking operations. Sensors 104 can be eye tracking sensors 104 that provide eye tracking data 148, such as data corresponding to at least one of a position or an orientation of one or both eyes of the user. Sensors 104 can be oriented in a direction towards the eyes of the user (e.g., as compared to sensors 104 that capture images of an environment outside of the HMD). For example, sensors 104 can include at least one fourth sensor 104d (e.g., as illustrated in FIG. 2) which can be oriented towards the eyes of the user to detect sensor data regarding the eyes of the user.

In some embodiments, sensors 104 output images of the eyes of the user, which can be processed to detect an eye position or gaze direction (e.g., first gaze direction) of the eyes. In some embodiments, sensors 104 process image data regarding the eyes of the user, and output the eye position or gaze direction based on the image data. In some embodiments, sensors 104 optically measure eye motion, such as by emitting light (e.g., infrared light) towards the eyes and detecting reflections of the emitted light.

As discussed further herein, an eye tracking operation can include any function, operation, routine, logic, or instructions executed by system 100 or components thereof to track data regarding eyes of the user, such as positions or orientations (e.g., gaze directions) of the eyes of the user as the eyes of the user move during use of the HMD. For example, the eye tracking operation can be performed using at least one of one or more sensors 104 or eye tracker 118. For example, the eye tracking operation can process eye tracking data 148 from sensor 104 to determine an eye position, gaze direction, gaze vector, focal point, point of view, etc., shown as gaze vector 136 of eye(s) of the user. In some embodiments, the eye tracking operation can be performed using eye tracker 118 that is implemented using a portion of processing circuitry 116 that is coupled with, mounted to, integral with, implemented using a same circuit board as, or otherwise provided with one or more sensors 104 that detect sensor data regarding the eyes of the user. In some embodiments, the eye tracking operation can be performed using an eye tracker 118 that receives sensor data by a wired or wireless connection from the one or more sensors 104 that are configured to detect sensor data regarding the eyes of the user (e.g., images of the eyes of the user); for example, eye tracker 118 can be implemented using the same processing hardware as at least one of error manager 120, tile generator 122, and/or image renderer 124. Various such combinations of sensor hardware of sensors 104 and/or processing hardware of processing circuitry 116 may be used to implement the eye tracking operation.

Eye tracker 118 can generate gaze vector 136 in various manners. For example, eye tracker 118 can process eye tracking data 148 to identify one or more pixels representing at least one of a position or an orientation of one or more eyes of the user. Eye tracker 118 can identify, using eye tracking data 148, gaze vector 136 based on pixels corresponding to light (e.g., light from light sources/light emitting diodes/actuators of sensors 104, such as infrared or near-infrared light from actuators of sensors 104, such as 850 nm light eye tracking) reflected by the one or more eyes of the user. Eye tracker 118 can use light from various illumination sources or reflections in the HMD or AR system, such as from waveguides, combiners, or lens cameras. Eye tracker 118 can determine gaze vector 136 or eye position by determining a vector between a pupil center of one or more eyes of the user and a corresponding reflection (e.g., corneal reflection). Gaze vector 136 can include position data such as at least one of a position or an orientation of each of one or more eyes of the user. The position data can be in three-dimensional space, such as three-dimensional coordinates in a Cartesian, spherical, or other coordinate system. Gaze vector 136 can include position data including a gaze direction of one or more eyes of the user. In some embodiments, eye tracker 118 includes a machine learning model. The machine learning model can be used to generate eye position or gaze vector 136 based on eye tracking data 148.

Processing circuitry 116 can include an error manager 120. Error manager 120 is configured to receive eye tracking data 148 from sensor(s) 104 and determine gaze error 126 associated with gaze vector 136. Gaze error 126 can include error for eye position, gaze direction, eye direction, etc., of gaze vector 136 (e.g., gaze location, gaze vector 302, etc.). Error manager 120 can receive eye tracking data 148 from sensor(s) 104 and perform an error analysis to determine gaze error 126. Error manager 120 monitors eye tracking data 148 over time and/or gaze vector 136 over time and determines gaze error 126 based on eye tracking data 148 and/or gaze vector 136, according to some embodiments. In some embodiments, error manager 120 provides gaze error 126 to tile generator 122. Eye tracker 118 also provides gaze vector 136 to tile generator 122, according to some embodiments. Error manager 120 can be configured to identify, determine, calculate, etc., any of rotational velocity, prediction error, fixation error, a confidence interval of gaze vector 136, random error, measurement error of gaze vector 136, etc.

Processing circuitry 116 includes tile generator 122, according to some embodiments. Tile generator 122 is configured to receive gaze vector 136 from eye tracker 118 and gaze error 126 from error manager 120, according to some embodiments. Tile generator 122 is configured to define one or more tiles 128 (e.g., tiles 602 shown in FIGS. 6-15 and 21), superpixels, collection of pixels, render areas, resolution areas, etc., for image renderer 124, according to some embodiments. In some embodiments, tiles 128 are used to divide, subdivide, provide, manage, display, etc., portions of an image, and may cooperatively construct, provide, define, display, etc., a completed or foveated image in a display or render buffer on a display (e.g., display(s) 164). For example, the various tiles 128 can each provide a portion of an image, and when constructed, provided, or viewed together, may cooperatively provide or display the entire image on the display or render buffer of the display(s) 164. Tile generator 122 generates tiles 128 based on gaze vector 136, a focal gaze location of the user's eyes, a reference gaze location, a direction of gaze, eye position, a point of interest, etc., according to some embodiments. Tile generator 122 generates various subsets of tiles 128 for displaying imagery on display(s) 164 and corresponding resolutions, according to some embodiments. In some embodiments, tile generator 122 defines a first set of tiles 128 that should have a high resolution (e.g., a high level of detail, high image quality, etc.), a second set of tiles 128 that should have a medium resolution, and a third set of tiles that should have a low resolution. Tiles 128 include a corresponding size (e.g., height and width, number of pixels, gaze angles, etc.) for each tile 128, according to some embodiments.

In some embodiments, tiles 128 include data regarding a corresponding position on display(s) 164 or a display buffer of display(s) 164. For example, tile generator 122 generates multiple tiles 128 that collectively cover an entirety of display(s) 164 or the display buffer of display(s) 164 and associated positions within display(s) 164, according to some embodiments. Tile generator 122 provides tiles 128 to image renderer 124 for use in generating a rendered image 130, a display buffer, a display image, a render buffer, etc., according to some embodiments. Tile generator 122 also generates or defines tiles 128 based on gaze error 126, according to some embodiments. In some embodiments, tile generator 122 divides a total area of display(s) 164 into various subsections, collection of pixels, etc., referred to as tiles 128. Tile generator 122 assigns a corresponding resolution to each of tiles 128, according to some embodiments. In some embodiments, tile generator 122 redefines tiles 128 periodically or dynamically based on updated or new gaze error 126 and/or gaze vector 136. In some embodiments, tile generator 122 defines a size, shape, position, and corresponding resolution of imagery for each of tiles 128. In some embodiments, any of the size, position, and corresponding resolution of imagery for each of tiles 128 is determined by tile generator 122 based on gaze vector 136 and/or gaze error 126.

Processing circuitry 116 includes image renderer 124, according to some embodiments. In some embodiments, image renderer 124 is configured to receive tiles 128 from tile generator 122 and use tiles 128 to generate an image, a render buffer, a display image, a display buffer, etc., for display(s) 164. In some embodiments, image renderer 124 receives image data 132 and uses tiles 128 to display the image data on display(s) 164. In some embodiments, image renderer 124 receives tiles 128 and image data 132 and generates a rendered image 130 based on tiles 128 and image data 132. Image renderer 124 uses the size, shape, position, and corresponding resolution of each of tiles 128 to rasterize image data 132 to generate rendered image 130, according to some embodiments.

Image renderer 124 is a 3D image renderer or 2D image renderer, according to some embodiments. Image renderer 124 uses image related input data to process, generate and render display or presentation images to display or present on one or more display devices, such as via an HMD, according to some embodiments. Image renderer 124 generates or creates 2D images of a scene or view for display on display 164 and representing the scene or view in a 3D manner, according to some embodiments. The display or presentation data (e.g., image data 132) to be rendered includes geometric models of 3D objects in the scene or view, according to some embodiments. Image renderer 124 determines, computes, or calculates the pixel values of the display or image data to be rendered to provide the desired or predetermined 3D image(s), such as 3D display data for images 112 captured by the sensor 104, according to some embodiments. Image renderer 124 receives images 112, tiles 128, and head tracking data 150 and generates display images using images 112.

Image renderer 124 can render frames of display data to one or more displays 164 based on temporal and/or spatial parameters. Image renderer 124 can render frames of image data sequentially in time, such as corresponding to times at which images are captured by the sensors 104. Image renderer 124 can render frames of display data based on changes in position and/or orientation to sensors 104, such as the position and orientation of the HMD. Image renderer 124 can render frames of display data based on left-eye view(s) and right-eye view(s) such as displaying a left-eye view followed by a right-eye view or vice-versa.

Image renderer 124 can generate the display images using motion data regarding movement of the sensors 104a . . . n that captured images 112a . . . k. For example, the sensors 104a . . . n may change in at least one of position or orientation due to movement of a head of the user wearing an HMD that includes the sensors 104a . . . n (e.g., as described with reference to HMD system 200 of FIG. 2). Processing circuitry 116 can receive the motion data from a position sensor (e.g., position sensor 220 described with reference to FIG. 2). Image renderer 124 can use the motion data to calculate a change in at least one of position or orientation between a first point in time at which images 112a . . . k were captured and a second point in time at which the display images will be displayed, and generate the display images using the calculated change. Image renderer 124 can use the motion data to interpolate and/or extrapolate the display images relative to images 112a . . . k. Although image renderer 124 is shown as part of processing circuitry 116, the image renderer may be formed as part of other processing circuitry of a separate device or component, such as the display device, for example within the HMD.

System 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the lens within the frame of the glasses or goggles. Displays 164 may have a refresh rate the same or different than a rate of refresh or frame rate of processing circuitry 116 or image renderer 124 or the sensors 104.

Referring now to FIG. 2, in some implementations, an HMD system 200 can be used to implement system 100. HMD system 200 can include an HMD body 202, a left sensor 104a (e.g., left image capture device), a right sensor 104b (e.g., right image capture device), and display 164. HMD body 202 can have various form factors, such as glasses or a headset. The sensors 104a, 104b can be mounted to or integrated in HMD body 202. The left sensor 104a can capture first images corresponding to a first view (e.g., left eye view), and the right sensor 104b can capture images corresponding to a second view (e.g., right eye view).

HMD system 200 can include a top sensor 104c (e.g., top image capture device). Top sensor 104c can capture images corresponding to a third view different than the first view or the second view. For example, top sensor 104c can be positioned between the left sensor 104a and right sensor 104b and above a baseline between the left sensor 104a and right sensor 104b. This can enable top sensor 104c to capture images with depth information that may not be readily available to be extracted from the images captured by left and right sensors 104a, 104b. For example, it may be difficult for depth information to be effectively extracted from images captured by left and right sensors 104a, 104b in which edges (e.g., an edge of a table) are parallel to a baseline between left and right sensors 104a, 104b. Top sensor 104c, being spaced from the baseline, can capture the third image to have a different perspective, and thus enable different depth information to be extracted from the third image, than left and right sensors 104a, 104b.

HMD system 200 can include processing circuitry 116, which can perform at least some of the functions described with reference to FIG. 1, including receiving sensor data from sensors 104a, 104b, and 104c as well as eye tracking sensors 104, and processing the received images to calibrate an eye tracking operation.

HMD system 200 can include communications circuitry 204. Communications circuitry 204 can be used to transmit electronic communication signals to and receive electronic communication signals from at least one of a client device 208 or a server 212. Communications circuitry 204 can include wired or wireless interfaces (e.g., jacks, antennas, transmitters, receivers, transceivers, wire terminals) for conducting data communications with various systems, devices, or networks. For example, communications circuitry 204 can include an Ethernet card and port for sending and receiving data via an Ethernet-based communications network. Communications circuitry 204 can communicate via local area networks (e.g., a building LAN), wide area networks (e.g., the Internet, a cellular network), and/or conduct direct communications (e.g., NFC, Bluetooth). Communications circuitry 204 can conduct wired and/or wireless communications. For example, communications circuitry 204 can include one or more wireless transceivers (e.g., a Wi-Fi transceiver, a Bluetooth transceiver, a NFC transceiver, a cellular transceiver). For example, communications circuitry 204 can establish wired or wireless connections with the at least one of the client device 208 or server 212. Communications circuitry 204 can establish a USB connection with the client device 208.

HMD system 200 can be deployed using different architectures. In some embodiments, the HMD (e.g., HMD body 202 and components attached to HMD body 202) comprises processing circuitry 116 and is self-contained portable unit. In some embodiments, the HMD has portions of processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of processing circuitry 116 that work in cooperation with or in conjunction with processing circuitry, or portions thereof, of a desktop computing device. In some embodiments, the HMD has portions of processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as image capture and rendering to display 164. The HMD can transmit and receive data with the client device 208 to leverage the client device 208's computing power and resources which may have higher specifications than those of the HMD.

Server 212 can be any type of form of computing device that provides applications, functionality or services to one or more client devices 208 or other devices acting as clients. In some embodiments, server 212 can be a client device 208. Server 212 can be deployed in a data center or cloud computing environment accessible via one or more networks. The HMD and/or client device 208 can use and leverage the computing power and resources of server 212. The HMD and/or client device 208 can implement any portion of the image and rendering processing pipeline described in connection with FIGS. 1 and 3. Server 212 can implement any portion of the image and rendering processing pipeline described in connection with FIGS. 1 and 3, and in some cases, any portions of the image and rendering processing pipeline not performed by client device 208 or HMD. Server 212 may be used to update the HMD and/or client device 208 with any updated to the applications, software, executable instructions and/or data on the HMD and/or client device 208.

System 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c. The position sensor 220 can include at least one of an inertial measurement unit (IMU), an accelerometer, a gyroscope, or a magnetometer (e.g., magnetic compass).

System 200 can include a varifocal system 224. Varifocal system 224 can have a variable focal length, such that varifocal system 224 can change a focus (e.g., a point or plane of focus) as focal length or magnification changes. Varifocal system 224 can include at least one of a mechanical lens, liquid lens, or polarization beam plate. In some embodiments, varifocal system 224 can be calibrated by processing circuitry 116 (e.g., by a calibrator), such as by receiving an indication of a vergence plane from a calibrator which can be used to change the focus of varifocal system 224. In some embodiments, varifocal system 224 can enable a depth blur of one or more objects in the scene by adjusting the focus based on information received from the calibrator so that the focus is at a different depth than the one or more objects.

In some embodiments, display 164 includes one or more waveguides. The waveguides can receive (e.g., in-couple) light corresponding to display images to be displayed by display 164 from one or more projectors, and output (e.g., out-couple) the display images, such as for viewing by a user of the HMD. The waveguides can perform horizontal or vertical expansion of the received light to output the display images at an appropriate scale. The waveguides can include one or more lenses, diffraction gratings, polarized surfaces, reflective surfaces, or combinations thereof to provide the display images based on the received light. The projectors can include any of a variety of projection devices, such as LCD, LED, OLED, DMD, or LCOS devices, among others, to generate the light to be provided to the one or more waveguides. The projectors can receive the display images from processing circuitry 116 (e.g., from image renderer 124). The one or more waveguides can be provided through a display surface (e.g., glass), which can be at least partially transparent to operate as a combiner (e.g., combining light from a real world environment around the HMD with the light of the outputted display images).

Display 164 can perform foveated rendering based on the calibrated eye tracking operation, which can indicate a gaze point corresponding to the gaze direction generated by the eye tracking operation. For example, processing circuitry 116 can identify at least one of a central region of the FOV of display 164 (e.g., a plurality of pixels within a threshold distance from the gaze point) peripheral region of the FOV of display 164 based on the gaze point (e.g., a peripheral region represented by a plurality of pixels of the display images that are within a threshold distance of an edge of the display images or more than a threshold distance from the gaze point). Processing circuitry 116 can generate the display images to have a less quality (e.g., resolution, pixel density, frame rate) in the peripheral region than in the central region, which can reduce processing demand associated with operation of HMD system 200.

Gaze Vector and Point of Interest

Referring now to FIGS. 3-5, the gaze vector is shown in greater detail, according to some embodiments. Gaze vector 136 as used by processing circuitry 116 is represented graphically in FIGS. 3-5 as gaze vector 302, according to some embodiments. It should be understood that while gaze vector 136 is represented in a spherical coordinate system, gaze vector 136 can also be represented in a Cartesian coordinate system, a polar coordinate system, a cylindrical coordinate system, etc., or any other coordinate system. Gaze vector 302 is used by processing circuitry 116 to determine a focal point or gaze location 402 of the user's eyes, according to some embodiments.

Referring particularly to FIG. 3, a spherical coordinate system includes gaze vector 302, and a user's eye (or eyes) 140. Eye 140 is shown as a centerpoint of the spherical coordinate system, and gaze vector 302 extends radially outwards from eye 140, according to some embodiments. In some embodiments, a direction of gaze vector 302 is defined by one or more angles, shown as angle $\theta_1$ and angle $\theta_2$. In some embodiments, angle $\theta_1$ represents an angular amount between gaze vector 302 and a vertical axis 304. In some embodiments, angle $\theta_2$ represents an angular amount between gaze vector 302 and a horizontal axis 306. In some embodiments, vertical axis 304 and horizontal axis 306 are substantially perpendicular to each other and both extend through eye 140.

In some embodiments, eye tracker 118 of processing circuitry 116 is configured to determine values of both angle $\theta_1$ and angle $\theta_2$ based on eye tracking data 148. Eye tracker 118 can determine the values of angles $\theta_1$ and $\theta_2$ for both eyes 140, according to some embodiments. In some embodiments, eye tracker 118 determines the values of angles $\theta_1$ and $\theta_2$ and provides the angles to error manager 120 and/or tile generator 122 as gaze vector 136.

Referring particularly to FIGS. 4 and 5 gaze vector 302 can be used to determine a location of a point of interest, a focal point, a gaze point, a gaze location, a point, etc., shown as gaze location 402. Gaze location 402 has a location on display 164, according to some embodiments. In some embodiments, gaze location 402 has an x location and a y location (e.g., a horizontal and a vertical location) on display 164. In some embodiments, gaze location 402 has a location in virtual space, real space, etc. In some embodiments, gaze location 402 has a two dimensional location. In some embodiments, gaze location 402 has a three-dimensional location. Gaze location 402 can have a location on display 164 relative to an origin or a reference point on display 164 (e.g., a center of display 164, a corner of display 164, etc.). Gaze location 402 and gaze vector 302 can be represented using any coordinate system, or combination of coordinate systems thereof. For example, gaze location 402 and/or gaze vector 302 can be defined using a Cartesian coordinate system, a polar coordinate system, a cylindrical coordinate system, a spherical coordinate system, a homogeneous coordinate system, a curvilinear coordinate system, an orthogonal coordinate system, a skew coordinate system, etc.

In some embodiments, tile generator 122 and/or eye tracker 118 are configured to use a distance d between the user's eye 140 and display 164. The distance d can be a known or sensed distance between the user's eye 140 and display 164, according to some embodiments. For example, sensors 104 can measure, detect, sense, identify, etc., the distance d between the user's eye 140 and display 164. In some embodiments, the distance d is a known distance based on a type or configuration of the HMD.

The distance d and the angles $\theta_1$ and $\theta_2$ can be used by eye tracker 118 to determine gaze vector 302/136. In some embodiments, eye tracker 118 uses the distance d and the angles $\theta_1$ and $\theta_2$ to determine the location of gaze location 402. In some embodiments, eye tracker 118 provides the distance d and the angles $\theta_1$ and $\theta_2$ to tile generator 122. Tile generator 122 uses the distance d and the angles $\theta_1$ and $\theta_2$ to determine the location of gaze location 402 relative to a reference point on display 164.

FIG. 4 is a top view of display 164 and the user's eye 140, according to some embodiments. FIG. 4 shows the angle $\theta_1$, according to some embodiments. Likewise, FIG. 5 is a side view of display 164 and the user's eye 140 and shows the angle $\theta_2$, according to some embodiments. Tile generator 122 and/or eye tracker 118 use the distance d and the angles $\theta_1$ and $\theta_2$ to determine the position/location of gaze location 402, according to some embodiments. In some embodiments, tile generator 122 uses the position/location of gaze location 402 to define tiles 128. It should be understood that while display 164 is shown as a generally flat display screen, in some embodiments, display 164 is a curved, arcuate, etc., display screen. A rectangular display screen is shown for ease of illustration and description only. Accordingly, all references to "local positions," "local coordinates," "Cartesian coordinates," etc., of display 164 may refer to associated/corresponding angular values of angle $\theta_1$ and/or angle $\theta_2$.

Tile Definition

Referring to FIGS. 6-11, display 164 can include a display buffer having tiles 602, according to some embodiments. In some embodiments, tiles 602 are defined by tile generator 122 based on the location/position of gaze location 402. Gaze location 402 represents an approximate location on display 164 that the user is viewing (e.g., a point that the user's gaze is directed towards, a point that the user's eyes are focused on, etc.), according to some embodiments. In some embodiments, gaze location 402 represents the point or location that the user's gaze is directed towards.

Display 164 includes a display buffer having tiles 602 with a width w and a height h, according to some embodiments. In some embodiments, the width w is referred to as a length along a central horizontal axis of display 164 or the display buffer (e.g., a straight horizontal axis if display 164 is straight, a curved horizontal axis if display 164 is curved) or along an X-axis of display 164 (shown in FIG. 7). Likewise, the height h is referred to as a height along a vertical axis of display 164 (e.g., a straight vertical axis if display 164 is straight, a curved vertical axis if display 164 is curved about the horizontal axis) or along a Y-axis of display 164 (shown in FIG. 7). In some embodiments, the width w and the height h are angular values of angle $\theta_1$ and $\theta_2$. For example, the width w of tiles 602 may be an 11 degrees (e.g., an amount of 11 degrees for angle $\theta_1$ from opposite sides of tile 602), and the height h of tiles 602 may be 17 degrees (e.g., an amount of 17 degrees for angle $\theta_2$ from top and bottom sides of tile 602). In some embodiments, all of tiles 602 have a uniform height h and width w. In other embodiments, tiles 602 have a non-uniform height h and width w. In some embodiments, tile generator 122 defines two or more subsets of tiles 602. For example, tile generator 122 may define a first subset of tiles 602, a second subset of tiles 602, and a third subset of tiles 602. The height h and width w of the various subsets of tiles 602 may be uniform across each subset or may be non-uniform across each subset. For example, the first subset of tiles 602 may include tiles 602 with a first height $h_1$ and a first width $w_1$, while the second subset of tiles 602 may include tiles 602 with a second height $h_2$ and a second width $w_2$, while the third subset of tiles 602 may include tiles 602 with a third height $h_3$ and a third width $w_3$.

In some embodiments, each of tiles 602 have an area A=wh. In some embodiments, each of tiles 602 includes a collection of pixels that display a portion of an image that is displayed on display 164 to the user. Tiles 602 collectively or cooperatively display the image to the user on display 164, according to some embodiments. The image can be a rendered image of three dimensional objects, particles, characters, terrain, maps, text, menus, etc. In some embodiments, the image is a virtual reality image. In some embodiments, the image is an augmented reality image (e.g., imagery is overlaid or projected over a real-world image). For example, if display 164 is a display of a HMD virtual reality system, the image can be a representation of a virtual reality, a virtual space, a virtual environment, etc. Likewise, if display 164 is a display of a HMD augmented reality system, the image can be a representation of projected objects, characters, particles, text, etc., having a location in virtual space that matches or corresponds or tracks a location in real space.

Referring still to FIGS. 6-11, the display buffer of display 164 includes several sets or subsets of tiles, shown as a first set of tiles 602a, a second set of tiles 602b, and a third set of tiles 602c, according to some embodiments. In some embodiments, the resolution of tiles 602a is greater than the resolution of tiles 602b, and the resolution of tiles 602b is greater than the resolution of tiles 602c. In some embodiments, processing power of processing circuitry 116 can be reduced by decreasing the resolution of tiles 602 that are in the user's peripheral view. For example, tiles 602 that are currently being viewed out of the corner of the user's eye may be rendered at a lower resolution without the user noticing the reduced or lower resolution.

Confidence Factor

Referring particularly to FIGS. 1 and 6, tile generator 122 can use gaze error 126 or a confidence factor of gaze location 402 to define tiles 602 for foveated rendering. In some embodiments, gaze error 126 is represented graphically by error 604. In some embodiments, tile generator 122 and/or error manager 120 determines a confidence factor C based on gaze vector 136 or based on eye tracking data 148.

In some embodiments, the confidence factor C is a standard deviation of the gaze location 402, an error, a variation, etc., of gaze location 402. In some embodiments, other inputs such as user inputs, known displayed imagery, and/or additional eye-tracking may also confirm the confidence factor C of increase it. For example, the processing circuitry 116 may verify that the user is reading text at the gaze location 402 (e.g., based on known displayed imagery) and may increase or confirm the confidence factor C. The confidence factor C may indicate an accuracy of gaze location 402, or a confidence or a likelihood that gaze location 402 is accurate. For example, the confidence factor C may be a percentage indicating the user's eyes are directed towards gaze location 402 with some degree of confidence. In some embodiments, higher values of the confidence factor C indicate that gaze location 402 is likely accurate (e.g., that the user's eyes are actually directed towards gaze location 402), while lower values of the confidence factor C indicate that gaze location 402 is less likely to be accurate. In some embodiments, tile generator 122 uses the confidence factor C to define tiles 602, or to define various properties or parameters of tiles 602. In some embodiments, the confidence factor C is a scalar value.

Gaze Location Velocity

Referring particularly to FIGS. 1 and 7, tile generator 122 can use a velocity $\vec{v}$ of gaze location 402 to define tiles 602. In some embodiments, the velocity $\vec{v}$ is a vector including components in different directions. For example, the velocity $\vec{v}$ may have the form:

$$\vec{v} = v_x \hat{i} + v_y \hat{j}$$

where $v_x$ is a velocity of gaze location 402 in the X-direction, $\hat{i}$ is a unit vector extending in the X-direction, $v_y$ is a velocity of gaze location 402 in the Y-direction, and $\hat{j}$ is a unit vector extending in the Y-direction. In some embodiments, the velocity $\vec{v}$ of gaze location 402 is expressed in terms of $\theta_1$ and $\theta_2$. For example, gaze location 402 may be expressed in terms of a time rate of change of $\theta_1$ (i.e., $\dot{\theta}_1$) and a time rate of change of $\theta_2$ (i.e., $\dot{\theta}_2$).

In some embodiments, the velocity $\vec{v}$ is a speed of a change of the gaze location 402 in either the X-direction or the Y-direction on display 164. The velocity $\vec{v}$ can be determined by tile generator 122, eye tracker 118, or error manager 120 based on received eye tracking data 148. In some embodiments, tile generator 122 receives the gaze vector 136 and tracks gaze vector 136 over time. Tile generator 122 can determine a rate of change of gaze vector 136 (e.g., a rate of change of gaze location 402 and/or a rate of change of gaze vector 302) as the velocity $\vec{v}$. Tile generator 122 may use the velocity $\vec{v}$ to define tiles 602 or define various parameters of tiles 602.

Relative Position of Gaze Location

Figure 8:
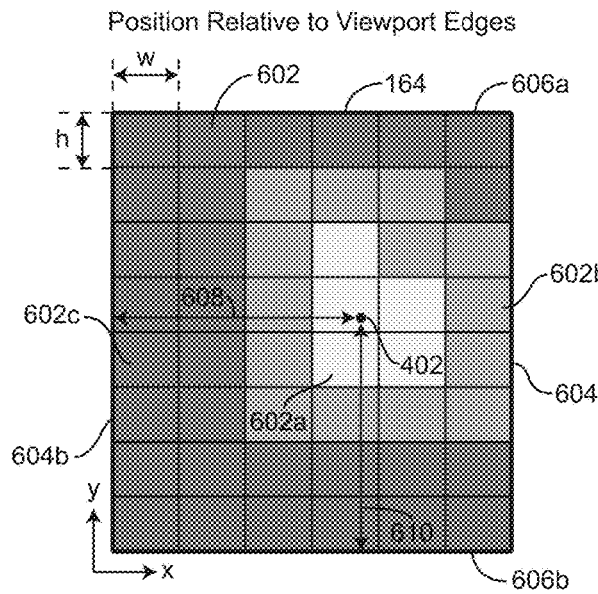
FIG. 8 is the tiled display buffer of the display screen of FIG. 6 showing a relative distance between the gaze location and one or more edges of the display screen, according to some embodiments.

Referring particularly to FIGS. 1 and 8, tile generator 122 may determine, obtain, identify, calculate, etc., a relative distance between gaze location 402 and various edges of display 164 (e.g., viewport edges). In some embodiments, display 164 includes a first vertical edge 604a, a second vertical edge 604b, a first horizontal edge 606a, and a second horizontal edge 606b. In some embodiments, first vertical edge 604a and second vertical edge 604b extend in the Y-direction of display 164. Likewise, first horizontal edge 606a and second horizontal edge 606b can extend in the X-direction of display 164. First horizontal edge 606a, second horizontal edge 606b, first vertical edge 604a, and second vertical edge 604b may cooperatively define outer peripheries of display 164.

In some embodiments, tile generator 122 determines or calculates a relative horizontal distance 608 between gaze location 402 and at least one of first vertical edge 604a or second vertical edge 604b. In some embodiments, tile generator 122 determines or calculates a relative vertical distance 610 between gaze location 402 and at least one of first horizontal edge 606a or second vertical edge 604b. In some embodiments, horizontal distance 608 extends along the X-axis and vertical distance 610 extends along the Y-axis.

In some embodiments, a quality of imagery provided to the user on display 164 at, near, or proximate any of edges 604a-b or 606a-b is lower than a quality of imagery provided to the user on display 164 near a center (e.g., a centerpoint, a centroid, etc.) of display 164. This may be due to reduced image quality abilities of display 164 near edges 604a-b or 606a-b, and due to an angle at which the user views edge-portions of display 164. In some embodiments, tile generator 122 uses the relative horizontal distance 608 and/or the relative vertical distance 610 to define tiles 602.

Tile Size

Figure 9:
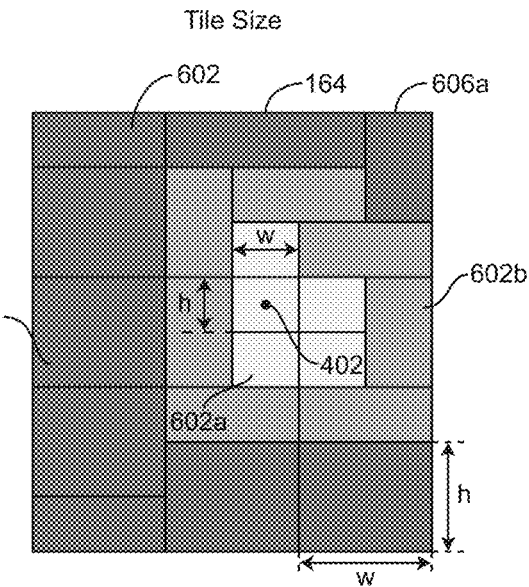
FIG. 9 is the tiled display buffer of the display screen of FIG. 6 showing several sets of tiles having different sizes, according to some embodiments.

Referring particularly to FIGS. 1 and 9, tile generator 122 can define, adjust, update, etc., tiles 602 having the height h and width w. In some embodiments, tile generator 122 defines or provides a first tile 602 that is centered at gaze location 402. Tile generator 122 can determine the height h and width w of the first tile 602 that is centered at gaze location 402 using any of the gaze location 402, the confidence factor C, the velocity $\vec{v}$ of gaze location 402, the relative horizontal distance 608, or the relative vertical distance 610.

In some embodiments, tile generator 122 uses gaze location 402 to determine a centerpoint of the first tile 602. In this way, tile generator 122 may define a position of the first tile 602 to match the gaze location 402 so that the first tile 602 is centered at gaze location 402.

In some embodiments, tile generator 122 uses the confidence factor C to determine the height h and/or the width w of the first tile 602 or any of the other tiles 602 of the display buffer of display 164. In some embodiments, tile generator 122 uses a relationship, an equation, a function, etc., to define the height h or the width w of tiles 602 where increased values of the confidence factor C correspond to decreased values of the height h or width w. For example, a high confidence factor C may indicate that the user's gaze is likely directed towards gaze location 402, and tile generator 122 may define the first tile 602 (and/or other tiles 602 in a fovea region) having a smaller height h and width w. Likewise, if the confidence factor C is lower, tile generator 122 may define the first tile 602 having a larger height h and/or a larger width w (since the user's gaze may be directed nearby but not at gaze location 402).

In some embodiments, tiles 602 that are proximate or adjacent the first tile 602 centered at gaze location 402 also have a height h or width w that is dependent upon the confidence factor C. For example, tiles 602 that are proximate, adjacent, neighboring, etc., the first tile 602 can have height h and width w that is inversely proportional to a magnitude of the confidence factor C. In some embodiments, tiles 602 that are proximate or adjacent or neighboring first tile 602 define a fovea region. Tiles 602 in the fovea region may all have a uniform height h and width w or may have different (e.g., non-uniform) heights h and widths w.

In some embodiments, the height h of tiles 602 is inversely proportional to the magnitude or the value of the confidence factor C. For example, tile generator 122 defines tiles 602 where:

$$h \propto \frac{1}{C}$$

and/or:

$$w \propto \frac{1}{C}$$

according to some embodiments.

In some embodiments, tile generator 122 uses a predefined function, relationship, equation, model, etc., to determine the height h and width w of tiles 602. Tile generator 122 may use a first relationship to define the height h and width w of the first tile 602 that is centered at gaze location 402, and a different relationship to define the height h and width w of tiles that are proximate first tile 602.

In some embodiments, tile generator 122 also uses the velocity $\vec{v}$ to determine or define the height h and width w of tiles 602. For example, in some embodiments, tile generator 122 calculates a magnitude $v_{mag}$ of the velocity $\vec{v}$. In some embodiments, tile generator 122 defines a size or area A of tiles 602 using the magnitude $v_{mag}$. In some embodiments, tile generator 122 uses a relationship, function, equation, etc., to determine or define the area A of tiles 602 based on the magnitude $v_{mag}$ of the velocity $\vec{v}$, where the area is proportional to the magnitude $v_{mag}$. For example, if the magnitude $v_{mag}$ of the velocity $\vec{v}$ is large or increases, the area A of tiles 602 may increase or be larger. Likewise, smaller values of the magnitude $v_{mag}$ of the velocity $\vec{v}$ result in tile generator 122 defining tiles 602 with a smaller area A.

In some embodiments, tile generator 122 uses a predetermined function, relationship, equation, etc., to determine the width w of one or more tiles 602 using the magnitude of the velocity. For example, tile generator 122 may use a relationship:

$$w=f(v_{mag})$$

where increased values of $v_{mag}$ correspond to increased values of the width w. In some embodiments, the relationship $f$ is a linear relationship, while in other embodiments, the relationship is a non-linear relationship.

In some embodiments, tile generator 122 uses the velocity of the gaze location 402 in the X-direction, $v_x$, to determine the width w of tiles 602. In some embodiments, the velocity of the gaze location 402 in the X-direction, $v_x$, is an instantaneous velocity, or an average velocity. For example, tile generator 122 uses a predetermined function, equation, relationship, etc., to determine or define the width w of one or more tiles 602:

$$w=f(v_x)$$

where $v_x$ is the velocity of gaze location 402 in the X-direction, w is a width of one or more tiles 602, and $f$ is a function or a relationship that relates $v_x$ to w such that increased values of $v_x$ correspond to increased values of w. In some embodiments, the function or relationship $f$ is a linear function, while in other embodiments, the function is a non-linear function. Advantageously, if the user's gaze is moving rapidly in a horizontal direction (e.g., along the X-axis), tile generator 122 may increase the width w or provide tiles 602 with an increased with w to compensate for or account for the movement of the user's gaze to facilitate improving the image quality of display 164.

In some embodiments, tile generator 122 uses the velocity of the gaze location 402 in the Y-direction, $v_y$, to determine the height h of tiles 602. In some embodiments, the velocity of the gaze location 402 in the Y-direction, $v_y$, is an instantaneous velocity, or an average velocity. For example, tile generator 122 uses a predetermined function, equation, relationship, etc., to determine or define the height h of one or more tiles 602:

$$h=f(v_y)$$

where $v_y$ is the velocity of gaze location 402 in the Y-direction, h is a height of one or more tiles 602, and $f$ is a function or a relationship that relates $v_y$ to h such that increased values of $v_y$ correspond to increased values of h. In some embodiments, the function or relationship $f$ is a linear function, while in other embodiments, the function is a non-linear function. Defining or providing tiles 602 having a height h that is based on the velocity of gaze location 402 in the vertical direction (e.g., the Y-direction), $v_y$, may facilitate improved image quality of display 164.

In some embodiments, tile generator 122 also uses the relative vertical distance 610 or the relative horizontal distance 608 to determine or define the size, height h, or width w of tiles 602. In some embodiments, the relative vertical distance 610 (e.g., the distance between gaze location 402 and a horizontal viewport edge in the vertical or Y-direction) is referred to as $\Delta d_y$ and the relative horizontal distance 608 (e.g., the distance between gaze location 402 and a vertical viewport edge in the horizontal or X-direction) is referred to as $\Delta d_x$. In some embodiments, tile generator 122 provides tiles 602 with increased size as gaze location 402 approaches edges of display 164. For example, when tile generator 122 provides the first tile 602 centered at gaze location 402, tile generator 122 may define the size A or the height h or the width w of the first tile 602 using the relative vertical distance $\Delta d_y$, and/or the relative horizontal distance $\Delta d_x$ of the gaze location 402 relative to the edges of display 164.

In some embodiments, tile generator 122 defines the size or area A of the first tile 602 (and any other tiles 602 of the display buffer of display 164) using a relationship:

$$A=f(\Delta d_x, \Delta d_y)$$

or:

$$A=f(\Delta d_x)$$

or:

$$A=f(\Delta d_y)$$

where A is the size/area of the tile 602, $\Delta d_x$ is the relative horizontal distance 608, $\Delta d_y$ is the relative vertical distance 610, and $f$ is a function, relationship, or equation that relates A to at least one of $\Delta d_x$ or $\Delta d_y$, such that decreased values of $\Delta d_x$ or $\Delta d_y$ result in increased values of A. In this way, if the user's gaze is directed towards an edge of display 164 or towards a region of display 164 proximate one of edges 604a-b and 606a-b, tile generator 122 may provide tiles 602 having a larger size to reduce processing requirements of processing circuitry 116.

In some embodiments, tile generator 122 defines or determines height h or width w of tiles 602 independently based on the relative horizontal distance $\Delta d_x$ or on the relative vertical distance $\Delta d_y$ between gaze location 402 and viewport edges of display 164. Tile generator 122 defines or determines the width w of one or more of tiles 602 using:

$$w=f(\Delta d_x, \Delta d_y)$$

or:

$$w=f(\Delta d_x)$$

or:

$$w=f(\Delta d_y)$$

where w is the width of one or more of tiles 602, $\Delta d_x$ is the relative horizontal distance between gaze location 402 and the first or second vertical edges 604a or 604b, and $f$ is an equation, function, or relationship that relates $\Delta d_x$ and/or $\Delta d_y$ to w such that decreased values of $\Delta d_x$ and/or $\Delta d_y$ correspond to increased values of w, according to some embodiments.

Tile generator 122 defines or determines the height h of one or more of tiles 602 using:

$$h=f(\Delta d_x, \Delta d_y)$$

or:

$$h=f(\Delta d_x)$$

or:

$$h=f(\Delta d_y)$$

where h is the height of one or more of tiles 602, $\Delta d_x$ is the relative horizontal distance between gaze location 402 and the first or second vertical edges 604a or 604b, and $f$ is an equation, function, or relationship that relates $\Delta d_x$ and/or $\Delta d_y$ to h such that decreased values of $\Delta d_x$ and/or $\Delta d_y$ correspond to increased values of h.

Fovea Region Radius

Figure 11:
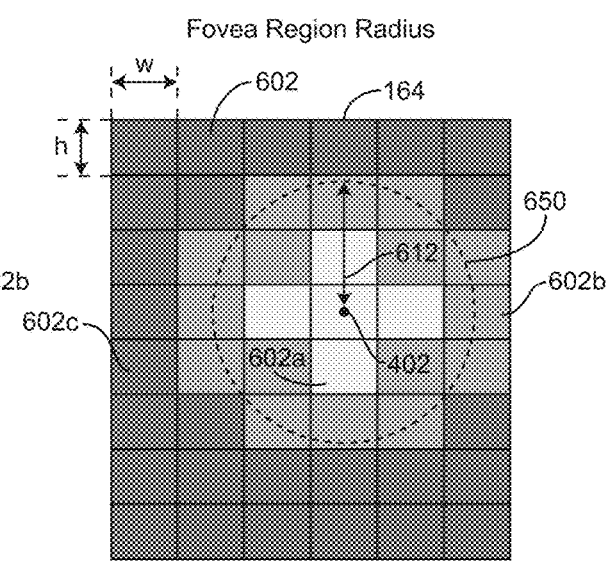
FIG. 11 is the tiled display buffer of the display screen of FIG. 6 showing a fovea region, according to some embodiments.

Referring particularly to FIGS. 1 and 11, tile generator 122 can provide tiles 602 to cooperatively define a fovea region 650. In some embodiments, fovea region 650 is a portion of display 164 or the display buffer of display 164 that is proximate, adjacent, surrounding, etc., gaze location 402. In some embodiments, fovea region 650 is a circular area that is centered at gaze location 402. Fovea region 650 can have a radius r, shown in FIG. 11 as radius 612.

In some embodiments, tile generator 122 defines, adjusts, updates, or provides tiles 602 to approximate fovea region 650. For example, tile generator 122 can generate, define, provide, adjust, etc., the first set 602a of tiles 602 and the second set 602b of tiles 602 to approximate the fovea region 650. In some embodiments, tile generator 122 defines, generates, provides, adjusts, etc., the third set 602c of tiles 602 for areas of display 164 outside of fovea region 650. In some embodiments, the first set 602a of tiles 602 are contained entirely within fovea region 650 or intersect a boundary of fovea region 650. In some embodiments, the second set 602b of tiles 602 intersect the boundary of fovea region 650. For example, the boundary of fovea region 650 may intersect one or more of the tiles 602 of the second set 602b. In some embodiments, the third set 602c of tiles 602 are defined as any tiles completely outside of fovea region 650, or tiles adjacent and outwards from the second set 602b of tiles 602.

Tile generator 122 can define the radius r of the fovea region 650 using any of, or a combination of, the confidence factor C, the velocity $\vec{v}$ of gaze location 402, the relative horizontal distance $\Delta d_x$, or the relative vertical distance $\Delta d_y$. For example, tile generator 122 can define the radius r using only the confidence factor C:

$$r=f(C)$$

where $f$ is a function, equation, relationship, etc., that relates r to the confidence factor C such that increased values of the confidence factors result in decreased values of the radius r of the fovea region 650, or vice versa.

In some embodiments, tile generator 122 can define the radius r using only the velocity $\vec{v}$ (e.g., the magnitude $v_{mag}$ of the velocity, the horizontal component $v_x$ of the velocity, the vertical component $v_y$ of the velocity, etc.). For example, tile generator 122 estimates, calculates, or determines the radius r of the fovea region 650 using:

$$r=f(v_{mag})$$

where $f$ is a function, equation, or relationship relating $v_{mag}$ to r such that increased values of $v_{mag}$ result in increased values of the radius r of the fovea region 650, and vice versa.

In some embodiments, fovea region 650 is an elliptical shape instead of a circular shape. If fovea region 650 is an elliptical shape, a longitudinal radius, distance, width, etc., of fovea region 650 can be determined by tile generator 122 based on the horizontal component $v_x$ of the velocity $\vec{v}$ while a vertical radius, distance, height, etc., of fovea region 650 can be determined or calculated by tile generator 122 based on the vertical component $v_y$ of $\vec{v}$.

In some embodiments, the radius r of fovea region 650 is determined by tile generator 122 based on the relative horizontal distance $\Delta d_x$ and/or the relative vertical distance $\Delta d_y$ of gaze location 402. For example, if gaze location 402 is close to an edge of display 164 (e.g., if the relative horizontal distance $\Delta d_x$ and/or the relative vertical distance $\Delta d_y$ of gaze location 402 is small), tile generator 122 may increase the radius r of the fovea region 650 or may decrease the radius r of the fovea region 650.

After tile generator 122 determines the radius r of the fovea region, tile generator 122 can proceed to generating, providing, defining, adjusting, etc., tiles 602 for foveated rendering. In some embodiments, tile generator 122 defines the tiles 602 using any of the techniques described herein.

Fovea Region Fall-Off

Figure 10:
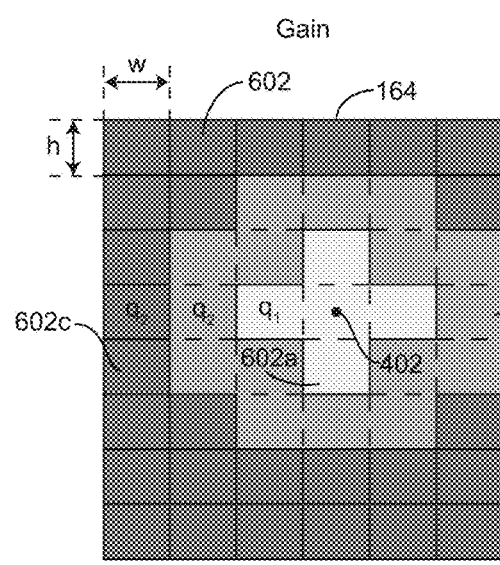
FIG. 10 is the tiled display buffer of the display screen of FIG. 6 showing several sets of tiles having different image resolutions, according to some embodiments.

Referring particularly to FIGS. 1 and 10, the first set 602a of tiles 602 may be assigned an image quality $q_1$, the second set 602b of tiles 602 may be assigned an image quality $q_2$, and the third set 602c of tiles 602 may be assigned an image quality $q_3$ by tile generator 122. In some embodiments, the image quality $q_1$ of the first set 602a of tiles 602 is greater than the image quality $q_2$ of the second set 602b of tiles 602, and the image quality $q_3$ is greater than the image quality $q_2$ of the second set 602b of tiles 602 (i.e., $q_1 > q_2 > q_3$).

Tile generator 122 may define or update or adjust a fall-off (e.g., a control function, a control parameter, a fall-off parameter, etc.) that defines a magnitude of a change in image quality between adjacent or different sets of tiles 602 at fovea region 650. For example, tiles 602 (e.g., the first set 602a) that are at the center of fovea region 650 may have a highest image quality (e.g., image quality $q_1$), while tiles 602 that are outside of or near the boundary of fovea region 650 may have a lower image quality (e.g., image quality $q_2$ or image quality $q_3$). In some embodiments, the fall-off is a difference between different image qualities or a rate of change of image quality with increased distance from a center of the fovea region 650. For example, the fall-off may be a difference between the image quality $q_1$ and $q_2$ or may be a difference between the image quality $q_2$ and $q_3$ (e.g., Fall_Off=$q_1$−$q_2$=$q_2$−$q_3$). In some embodiments, the fall-off is a vector of values (e.g., Fall_Off=[Fall_Off$_1$ Fall_Off$_2$]) that define a difference or a change in image quality between subsequent sets of tiles 602. For example, the first fall-off value Fall_Off$_1$ may be substantially equal to the difference between the first image quality $q_1$ and the second image quality $q_2$, while the second fall-off value Fall_Off$_2$ may be substantially equal to the difference between the second image quality $q_2$ and the third image quality $q_3$. In some embodiments, the first fall-off value Fall_Off$_1$ and the second fall-off value Fall_Off$_2$ are different.

For example, the image quality $q_1$ of the first set 602a may be significantly higher than the image quality $q_2$ of the second set 602b, while the image quality $q_3$ of the third set 602c may be only slightly lower than the image quality $q_2$ of the second set 602b.

In some embodiments, the fall-off is a function that expresses image quality with respect to a distance from the center of fovea region 650. For example, the fall-off may be a linearly decreasing or non-linearly decreasing function with respect to increased distance from the center of the fovea region 650 or with increased number of tiles between the center of the fovea region 650 and a position on the display 164 or the display buffer of display 164. In some embodiments, the fall-off is a continuous fall-off function that is approximated discretely with the different image qualities of the various sets of tiles 602. For example, the fall-off may be a linearly decreasing function such as:

$$q=\text{Fall\_Off}(r)=-mr+b$$

where q is image quality, r is a radial distance from the center of the fovea region 650 (e.g., from the gaze location 402), m is a slope (e.g., change in quality with respect to change in radial distance), and b is a coefficient. In some embodiments, the fall-off is or indicates a gradient (e.g., a decreasing gradient) of image quality with respect to increased distance from the gaze location 402 or with respect to increased distance from the center of the fovea region 650.

In some embodiments, the fall-off (e.g., the linear or non-linear rate of decay of the function, or the difference or change in image quality between different sets of tiles 602), is determined by image renderer 124 or by tile generator 122. In some embodiments, the fall-off is determined based on any of the confidence factor C, the velocity vector $\vec{v}$ of the gaze location 402, the relative horizontal distance $\Delta d_x$, or the relative vertical distance $\Delta d_y$. For example, the rate of fall-off of quality between different sets of tiles 602 (e.g., with respect to increased distance from the center of the fovea region 650 or with respect to increased distance from the gaze location 402) may be directly proportional to the confidence factor C. In this way, a confident measurement of the gaze location 402 may result in a rapid drop off in image quality with respect to increased distance from the center of the fovea region 650 or with respect to increased distance from the gaze location. Likewise, if the confidence factor C is low (e.g., indicating that the user may likely be looking at a region nearby or a distance from gaze location 402), the fall-off may be lower to ensure that the user is not directing their gaze towards a lower quality region or a tile 602 with a lower image quality.

In some embodiments, the fall-off is determined based on the velocity vector $\vec{v}$. For example, if the velocity vector $\vec{v}$ is substantially greater than 0 (e.g., if the velocity is non-zero, indicating that the user's gaze is changing or moving), tile generator 122 may decrease the fall-off so that the image quality falls off or decreases less rapidly with increased distance from the center of the fovea region 650 or with increased distance from the gaze location 402. In some embodiments, if the velocity vector $\vec{v}$ is substantially equal to 0, the fall-off may be increased so that the image quality provided by tiles 602 (e.g., by different sets of the tiles 602) rapidly falls of or decreases with respect to increased distance from the center of fovea region 650 or with respect to increased distance from gaze location 402.

In some embodiments, more or less than three different sets of tiles 602 are provided by tile generator 122. It should be understood that tile generator 122 may be configured to generate any number of sets of tiles using any of the techniques described herein. For example, tile generator 122 may define five sets of tiles 602, the first set having an image quality $q_1$, the second set having an image quality $q_2$, the third set having an image quality $q_3$, the fourth set having an image quality $q_4$, and the fifth set having an image quality $q_5$ where (i) the first set of tiles 602 are most proximate the gaze location 402, the second set of tiles 602 are adjacent the first set of tiles 602, the third set of tiles 602 are adjacent the second set of tiles 602, etc., and (ii) $q_1 > q_2 > q_3 > q_4 > q_5$.

Foveated Rendering Process

Figure 12:
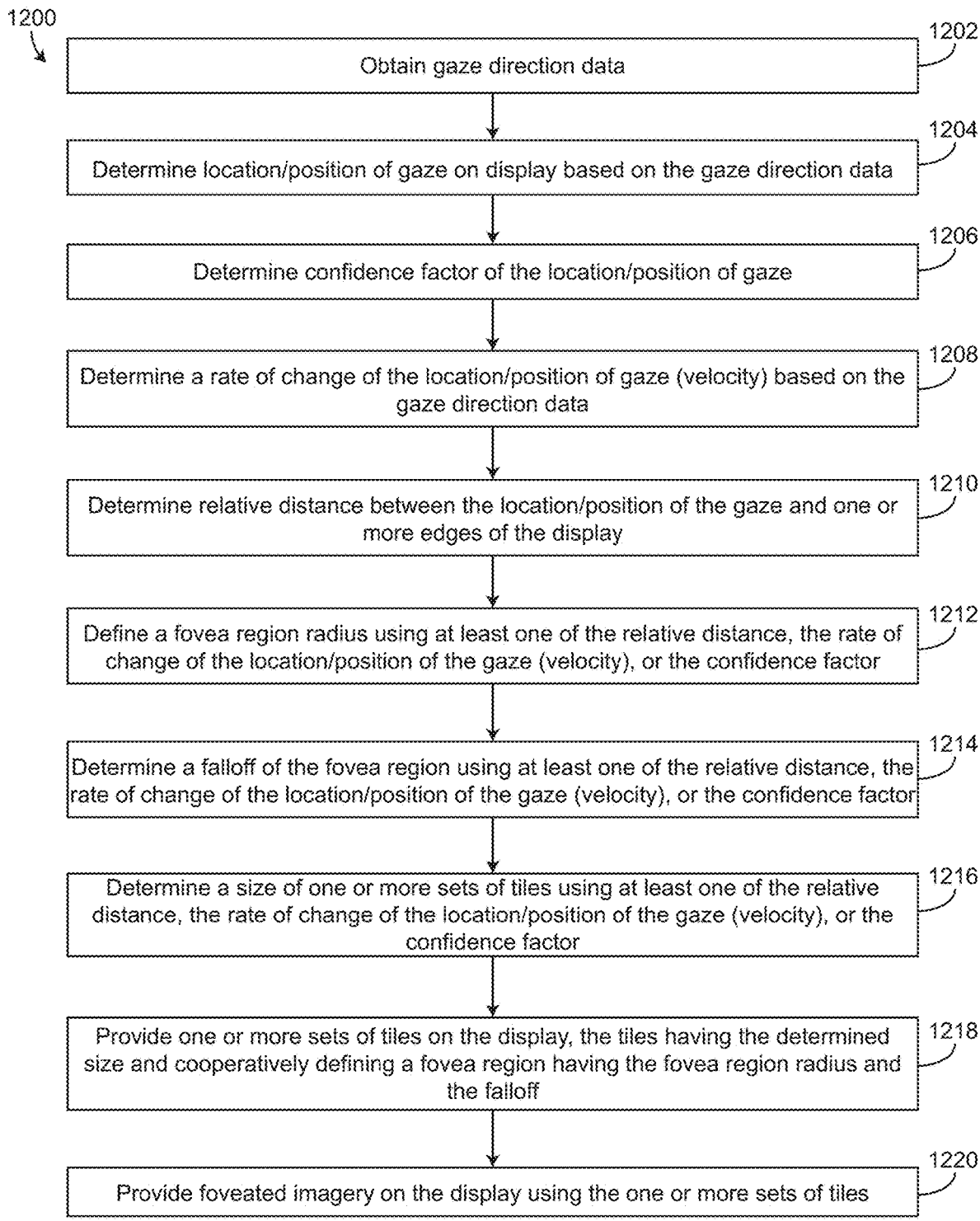
FIG. 12 is a flow diagram of a process for providing foveated rendering, according to some embodiments.

Referring particularly to FIG. 12, a flow 1200 for providing foveated rendered imagery on a display is shown, according to some embodiments. In some embodiments, flow 1200 includes operations 1202-1220 and is implemented using system 100. Flow 1200 can be performed by processing circuitry 116 or the various components thereof. Flow 1200 can be performed to facilitate reduced processing requirements of processing circuitry 116 while providing foveated rendered imagery to the user (e.g., via display 164).

Flow 1200 includes obtaining or receiving gaze direction data (operation 1202), according to some embodiments. In some embodiments, operation 1202 is performed by eye tracker 118 or by tile generator 122. The gaze direction data may be gaze vector 136 indicating gaze location 402 on display 164 or on the display buffer of display 164. In some embodiments, tile generator 122 receives gaze vector 136 from eye tracker 118. Eye tracker 118 can receive eye tracking data 148 from sensors 104 and may use eye tracking data 148 to identify a focal point, a gaze location, or a gaze vector (e.g., gaze vector 302).

Flow 1200 includes determining location/position of a user's gaze on a display (e.g., display 164) based on the gaze direction data (operation 1204), according to some embodiments. In some embodiments, operation 1204 is performed by eye tracker 118 based on the eye tracking data 148. Eye tracker 118 may receive the eye tracking data 148 and determine a position of gaze location 402 using eye tracking data 148 to perform operation 1204. Eye tracker 118 can then provide the determined location/position of the user's gaze to tile generator 122 for foveated rendering.

Flow 1200 includes determining a confidence factor of the location/position of the gaze (operation 1206), according to some embodiments. In some embodiments, operation 1206 is performed by tile generator 122 using any of the techniques described in greater detail above with reference to FIGS. 1 and 6. The confidence factor (e.g., confidence factor C) may indicate a confidence that the user's gaze is actually directed towards the gaze location (e.g., a confidence of the estimation of gaze location 402). In some embodiments, a high confidence factor indicates that the user's gaze is likely directed towards gaze location 402, while a low confidence factor indicates low confidence that the user's gaze is directed towards gaze location 402. In some embodiments, the confidence factor is determined based on eye tracking data. For example, the confidence factor may be a standard deviation of a gaze location, or may be determined/verified based on known imagery that is displayed to the user, or based on user inputs. In one example, operation 1206 is performed by tile generator 122 and/or error manager 120. Tile generator 122 and/or error manager 120 may verify or increase the confidence factor (e.g., the confidence factor C) based on known displayed imagery and the gaze location. If the user is currently displayed text at a specific location and the gaze location matches the location of the text, tile generator 122 and/or error manager 120 can increase or verify the confidence factor C (e.g., increase the confidence that the user is viewing the displayed text).

Flow 1200 includes determining a rate of change of the location/position of the gaze (e.g., the velocity $\vec{v}$) of gaze location 402 based on the gaze direction data (operation 1208), according to some embodiments. In some embodiments, operation 1208 is performed by tile generator 122 based on the gaze vector 136 or by eye tracker 118 based on eye tracking data 148. For example, tile generator 122 and/or eye tracker 118 may track the gaze location 402 over time and determine a rate of change of the gaze location 402 in multiple directions. In some embodiments, the velocity $\vec{v}$ is a vector that includes horizontal and vertical components (e.g., $v_x$ and $v_y$) which can be used to calculate or determine a magnitude and direction of the velocity of the gaze location 402. In some embodiments, the velocity is an instantaneous velocity. In other embodiments, the velocity is an averaged velocity that is averaged over a time period (e.g., 0.01, 0.1, 0.5, 1, or 2 seconds, etc.).

Flow 1200 includes determining relative distance between the location/position of the gaze (e.g., the gaze location 402) and one or more edges of the display (e.g., display 164) (operation 1210), according to some embodiments. In some embodiments, operation 1210 is performed by tile generator 122 based on the gaze location 402. For example, tile generator 122 can determine, calculate, estimate, etc., horizontal distance 608 (e.g., $\Delta d_x$) relative to at least one of vertical edges 604a or 604b based on the gaze location 402 and known locations of vertical edges 604a and 604b. Likewise, tile generator 122 can determine, calculate, estimate, etc., vertical distance 610 (e.g., $\Delta d_y$) relative to at least one of horizontal edges 606a and 606b based on the gaze location 402 and known locations of horizontal edges 606a and 606b. In some embodiments, the relative vertical distance 610 and the relative horizontal distance 608 indicate how close gaze location 402 is to edges of display 164.

Flow 1200 includes defining a fovea region radius r of a fovea region (e.g., fovea region 650) on the display using at least one of the relative distance (e.g., the relative horizontal distance 608, $\Delta d_x$ and/or the relative vertical distance 610, $\Delta d_y$), the rate of change of the location/position of the gaze location (e.g., the velocity vector $\vec{v}$), or the confidence factor (operation 1212), according to some embodiments. In some embodiments, the fovea region radius r is centered at the gaze location 402. In some embodiments, operation 1212 is performed by tile generator 122. In some embodiments, the fovea region radius r is increased if the velocity vector $\vec{v}$ indicates that the user's gaze is moving rapidly. In some embodiments, the fovea region radius r is increased if the confidence factor C is low or with respect to decreasing confidence factor C. In some embodiments, the fovea region radius of the fovea region 650 is determined by tile generator 122 using a combination of the relative horizontal distance 608, the relative vertical distance 610, the rate of change of the location/position of the gaze location 402, and the confidence factor C.

Flow 1200 includes determining a fall-off of the fovea region using at least one of the relative distance, the rate of change of the location/position of the gaze location (e.g., the velocity vector $\vec{v}$), or the confidence factor C (operation 1214), according to some embodiments. In some embodiments, the fall-off of the fovea region is a difference in assigned image quality across different sets of tiles (e.g., the subsets of tiles defined in operation 1216). In some embodiments, operation 1214 is performed by tile generator 122. In some embodiments, the fall-off is a rate of decay or a rate of decrease of image quality across different sets of tiles 602. For example, the fall-off of the fovea region 650 may indicate how rapidly the image quality of the tiles decreases with increased distance from the gaze location 402 or with increased distance from the center of the fovea region. In some embodiments, the fall-off is directly proportional to the confidence factor C. For example, tile generator 122 may select higher fall-off with increased values of the confidence factor C. Likewise, tile generator 122 may select higher fall-off with decreased values of the velocity vector $\vec{v}$. In some embodiments, if the velocity is substantially zero, tile generator 122 may select a largest fall-off so that the image quality rapidly decreases with increased distance from the center of the fovea region 650 or with increased distance from the gaze location 402. In some embodiments, the fall-off of the fovea region is determined or selected by tile generator 122 using a combination of the relative distance between the gaze location 402 and edges of the display 164, the rate of change of the location/position of the gaze (e.g., the velocity vector $\vec{v}$), and the confidence factor C.

Flow 1200 includes determining a size of one or more sets of tiles (operation 1216) using at least one of the relative distance, the rate of change of the location/position of the gaze (velocity), or the confidence factor, according to some embodiments. In some embodiments, each tile in a particular set has a uniform size (e.g., a same height h and a same width w). In other embodiments, the tiles in a particular set have different sizes (e.g., different heights h and different widths w). In some embodiments, tiles in different sets have a uniform size (e.g., the tiles in a first set have a same size as tiles in other sets), while in other embodiments, tiles in different sets have different sizes (e.g., the tiles in a first set that define the fovea region 650 have a smaller size than tiles in another set that surround the fovea region 650 and are outwards of the fovea region 650). In some embodiments, the size of the tiles is selected or determined based on the distance of the gaze location 402 relative to an edge of the display 164 or an edge of the display buffer of display 164. For example, if the gaze location 402 is proximate, at, or within a predetermined distance from any of the edges or borders of the display 164 or the display buffer of display 164, tile generator 122 may increase the size of tiles 602 that define the fovea region 650. Likewise, if the gaze location 402 is at a centerpoint of the display 164 (e.g., the distance between the gaze location 402 and the edges of the display is at a maximum), tile generator 122 may decrease the size of tiles 602 that define the fovea region 650. In some embodiments, operation 1216 includes assigning a render quality, an image quality, a resolution, etc., to each of the sets of tiles.

Flow 1200 includes providing the one or more sets of tiles on the display buffer of the display, the tiles having the size determined in operation 1216, and cooperatively defining the fovea region having the fovea region radius and the fall-off (operation 1218), according to some embodiments. In some embodiments, operation 1218 is performed by tile generator 122. Tile generator 122 can provide the defined tiles or the defined sets of tiles to image renderer 124 with their associated render qualities, image qualities, resolutions, etc., for foveated rendering. In some embodiments, tile generator 122 provides a first set of tiles that define the fovea region 650, or several first sets of tiles that define the fovea region 650 according to the results of operation 1216. Tile generator 122 can also provide additional or other sets of tiles that are outside of the fovea region 650 according to the results of operation 1216. In some embodiments, tiles (e.g., the third set 602c of tiles 602) that are outside of the fovea region 650 have a larger size, as determined by tile generator 122 in operation 1216.

Flow 1200 includes providing foveated imagery on the display using the one or more sets of tiles (operation 1220), according to some embodiments. In some embodiments, operation 1220 is performed by image renderer 124. Operation 1220 can include receiving image data 132 and rendering image data 132 according to the tiles provided in operations 1202-1218. In some embodiments, larger and/or lower resolution tiles (e.g., the third set 602c of tiles 602) are rendered at the lower resolution and up-scaled to the size (e.g., to the height h and the width w) as determined by tile generator 122 using nearest neighbor.

Server System

Figure 13:
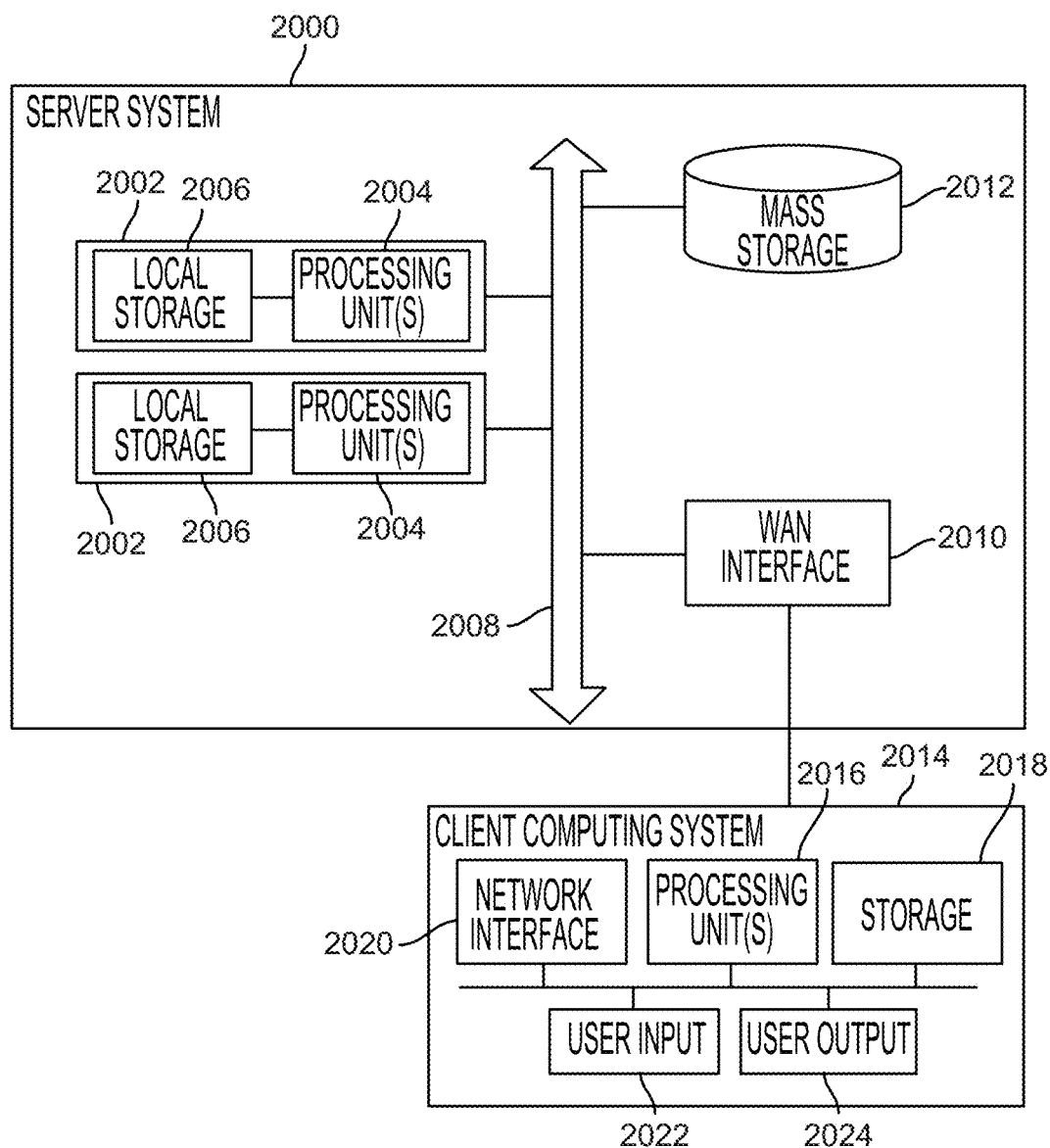
FIG. 13 is a block diagram of a computing environment that the systems of FIGS. 1 and 2 can be implemented in, according to some embodiments.

Various operations described herein can be implemented on computer systems. FIG. 13 shows a block diagram of a representative server system 2000 and client computing system 2014 usable to implement one or more embodiments of the present disclosure. Server system 2000 or similar systems can implement services or servers described herein or portions thereof. Client computing system 2014 or similar systems can implement clients described herein. Each of systems 100, 200 and others described herein can incorporate features of systems 2000, 2014.

Server system 2000 can have a modular design that incorporates a number of modules 2002 (e.g., blades in a blade server); while two modules 2002 are shown, any number can be provided. Each module 2002 can include processing unit(s) 2004 and local storage 2006.

Processing unit(s) 2004 can include a single processor, which can have one or more cores, or multiple processors. Processing unit(s) 2004 can include a general-purpose primary processor as well as one or more special-purpose co-processors such as graphics processors, digital signal processors, or the like. Some or all processing units 2004 can be implemented using customized circuits, such as application specific integrated circuits (ASICs) or field programmable gate arrays (FPGAs). Such integrated circuits execute instructions that are stored on the circuit itself. Processing unit(s) 2004 can execute instructions stored in local storage 2006. Any type of processors in any combination can be included in processing unit(s) 2004.

Local storage 2006 can include volatile storage media (e.g., conventional DRAM, SRAM, SDRAM, or the like) and/or non-volatile storage media (e.g., magnetic or optical disk, flash memory, or the like). Storage media incorporated in local storage 2006 can be fixed, removable or upgradeable as desired. Local storage 2006 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2004 need at runtime. The ROM can store static data and instructions that are needed by processing unit(s) 2004. The permanent storage device can be a non-volatile read-and-write memory device that can store instructions and data even when module 2002 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 2006 can store one or more software programs to be executed by processing unit(s) 2004, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 2004 cause server system 2000 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 2004. Software can be implemented as a single program or a collection of separate programs or program modules that interact as desired. From local storage 2006 (or non-local storage described below), processing unit(s) 2004 can retrieve program instructions to execute and data to process in order to execute various operations described above.

In some server systems 2000, multiple modules 2002 can be interconnected via a bus or other interconnect 2008, forming a local area network that supports communication between modules 2002 and other components of server system 2000. Interconnect 2008 can be implemented using various technologies including server racks, hubs, routers, etc.

A wide area network (WAN) interface 2010 can provide data communication capability between the local area network (interconnect 2008) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 2006 can provide working memory for processing unit(s) 2004, providing fast access to programs and/or data to be processed while reducing traffic on interconnect 2008. Storage for larger quantities of data can be provided on the local area network by one or more mass storage subsystems 2012 that can be connected to interconnect 2008. Mass storage subsystem 2012 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2012. Additional data storage resources may be accessible via WAN interface 2010 (potentially with increased latency).

Server system 2000 can operate in response to requests received via WAN interface 2010. For example, one of modules 2002 can implement a supervisory function and assign discrete tasks to other modules 2002 in response to received requests. Conventional work allocation techniques can be used. As requests are processed, results can be returned to the requester via WAN interface 2010. Such operation can generally be automated. WAN interface 2010 can connect multiple server systems 2000 to each other, providing scalable systems capable of managing high volumes of activity. Conventional or other techniques for managing server systems and server farms (collections of server systems that cooperate) can be used, including dynamic resource allocation and reallocation.

Server system 2000 can interact with various user-owned or user-operated devices via a wide-area network such as the Internet. An example of a user-operated device is shown in FIG. 20 as client computing system 2014. Client computing system 2014 can be implemented, for example, as a consumer device such as a smartphone, other mobile phone, tablet computer, wearable computing device (e.g., smart watch, eyeglasses), desktop computer, laptop computer, and so on.

For example, client computing system 2014 can communicate via WAN interface 2010. Client computing system 2014 can include conventional computer components such as processing unit(s) 2016, storage device 2018, network interface 2020, user input device 2022, and user output device 2024. Client computing system 2014 can be a computing device implemented in a variety of form factors, such as a desktop computer, laptop computer, tablet computer, smartphone, other mobile computing device, wearable computing device, or the like.

Processor 2016 and storage device 2018 can be similar to processing unit(s) 2004 and local storage 2006 described above. Suitable devices can be selected based on the demands to be placed on client computing system 2014; for example, client computing system 2014 can be implemented as a "thin" client with limited processing capability or as a high-powered computing device. Client computing system 2014 can be provisioned with program code executable by processing unit(s) 2016 to enable various interactions with server system 2000 of a message management service such as accessing messages, performing actions on messages, and other interactions described above. Some client computing systems 2014 can also interact with a messaging service independently of the message management service.

Network interface 2020 can provide a connection to a wide area network (e.g., the Internet) to which WAN interface 2010 of server system 2000 is also connected. Network interface 2020 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2022 can include any device (or devices) via which a user can provide signals to client computing system 2014; client computing system 2014 can interpret the signals as indicative of particular user requests or information. User input device 2022 can include any or all of a keyboard, touch pad, touch screen, mouse or other pointing device, scroll wheel, click wheel, dial, button, switch, keypad, microphone, and so on.

User output device 2024 can include any device via which client computing system 2014 can provide information to a user. For example, user output device 2024 can include a display to display images generated by or delivered to client computing system 2014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 2024 can be provided in addition to or instead of a display. Examples include indicator lights, speakers, tactile "display" devices, printers, and so on.

Configuration of Illustrative Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without depa1rting from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   identifying a current gaze location and a relative distance between the current gaze location and an edge of a display using eye tracking data;
   establishing a first tile centered at the current gaze location and a plurality of tiles that surround the first tile using the current gaze location and the relative distance between the current gaze location and the edge of the display; and
   providing a foveated rendered image using the first tile and the plurality of tiles.

2. The method of claim 1, wherein the first tile and the plurality of tiles are further defined based on a confidence factor of the current gaze location, and a speed of change of the gaze location.

3. The method of claim 1, wherein establishing the first tile and the plurality of tiles comprises defining or adjusting a size of one or more of the first tile and the plurality of tiles, defining or adjusting a fall-off of a fovea region of the first tile and the plurality of tiles, or defining or adjusting a radius of the fovea region, using the current gaze location on the display and the relative distance between the current gaze location and the edge of the display.

4. The method of claim 3, wherein the fall-off is utilized as a rate of change of image quality of the first tile and the plurality of tiles with respect to increased distance from the current gaze location.

5. The method of claim 1, wherein an image quality provided on the first tile decreases as the relative distance between the current gaze location and the edge of the display decreases.

6. The method of claim 1, wherein one or more tiles of the plurality of tiles that are proximate the edge of the display or in a user's peripheral vision have a larger size than at least one tile of the plurality of tiles that are proximate to a centerpoint of the display or the first tile.

7. The method of claim 1, wherein one or more tiles of the plurality of tiles that are proximate or at the current gaze location have a smaller size than one or more tiles of the plurality of tiles that are distal from the current gaze location.

8. The method of claim 1, further comprising increasing a size of one or more tiles of the plurality of tiles proximate the current gaze location in response to a decrease in a confidence factor of the current gaze location.

9. The method of claim 1, further comprising increasing a fall-off of a fovea region of the first tile and the plurality of tiles in response to an increase in a confidence factor of the current gaze location.

10. The method of claim 1, further comprising increasing a size of one or more tiles of the first tile and the plurality of tiles that define a fovea region in response to an increase in a speed of change of the current gaze location.

11. A device comprising:
a combiner configured to provide foveated imagery to a user;
an imaging device configured to obtain eye tracking data; and
processing circuitry configured to:
identify a current gaze location and a relative distance between the current gaze location and an edge of the combiner using the eye tracking data;
establish or adjust a fall-off of a fovea region defined by a plurality of tiles using the gaze location and the relative distance between the current gaze location and the edge of the combiner, the fall-off defining a change in image quality between adjacent tiles of the plurality of tiles; and
provide a foveated rendered image to the user using the plurality of tiles and the combiner.

12. The device of claim 11, wherein one or more tiles of the plurality of tiles that are proximate the edge of the combiner or are in the user's peripheral vision are defined or adjusted to have a larger size than at least one tile of the plurality of tiles that are closer to a centerpoint of the combiner.

13. The device of claim 11, wherein one or more tiles of the plurality of tiles that are proximate or at the gaze location have a smaller size than one or more tiles of the plurality of tiles that are distal from the gaze location.

14. The device of claim 11, wherein the processing circuitry is configured to increase a size of one or more tiles of the plurality of tiles that are proximate the gaze location in response to a decrease in a confidence factor of the gaze location.

15. The device of claim 11, wherein the processing circuitry is configured to increase the fall-off of the fovea region in response to a change in the relative distance between the current gaze location and the edge of the combiner.

16. The device of claim 11, wherein the processing circuitry is configured to increase a size of one or more tiles of the plurality of tiles that define the fovea region in response to an increase in a speed of a change of the current gaze location.

17. The device of claim 11, wherein one or more tiles of the plurality of tiles that are proximate the current gaze location are used to provide a higher quality image to the user, and one or more tiles of the plurality of tiles that are distal from the gaze location are used to provide a lower quality image to the user.

18. The device of claim 17, wherein the fall-off defines a change of image quality between adjacent tiles of the plurality of tiles with different image quality with respect to increased distance from the gaze location.

19. A system comprising:
a combiner configured to provide imagery to a user;
an imaging device configured to obtain eye tracking data; and
processing circuitry configured to:
identify a current gaze location and a relative distance between the current gaze location and an edge of the combiner;
establish a first tile centered at the current gaze location and a plurality of tiles that surround the first tile using the current gaze location and the relative distance between the current gaze location and the edge of the combiner; and
provide foveated imagery to the user using the first tile and the plurality of tiles.

20. The system of claim 19, wherein the first tile is configured to provide imagery at an image quality greater than or equal to one or more of the plurality of tiles, wherein a fall-off of a fovea region defines a rate of change of image quality of the first tile and the plurality of tiles with increased distance from a center of the first tile.

* * * * *